United States Patent
Bergquist et al.

(10) Patent No.: US 10,543,738 B2
(45) Date of Patent: Jan. 28, 2020

(54) HYBRID POWERTRAIN, METHOD FOR CONTROLLING SUCH A HYBRID POWERTRAIN, VEHICLE COMPRISING SUCH A HYBRID POWERTRAIN, COMPUTER PROGRAM FOR CONTROLLING SUCH A HYBRID POWERTRAIN, AND A COMPUTER PROGRAM PRODUCT COMPRISING PROGRAM CODE

(71) Applicant: Scania CV AB, Södertälje (SE)

(72) Inventors: Mikael Bergquist, Huddinge (SE);
Mathias Björkman, Tullinge (SE);
Johan Lindström, Nyköping (SE);
Niklas Pettersson, Stockholm (SE)

(73) Assignee: Scania CV AB, Södertälje (SE)

( * ) Notice: Subject to any disclaimer, the term of this patent is extended or adjusted under 35 U.S.C. 154(b) by 51 days.

(21) Appl. No.: 15/511,613

(22) PCT Filed: Sep. 29, 2015

(86) PCT No.: PCT/SE2015/051022
§ 371 (c)(1),
(2) Date: Mar. 15, 2017

(87) PCT Pub. No.: WO2016/053171
PCT Pub. Date: Apr. 7, 2016

(65) Prior Publication Data
US 2017/0305256 A1    Oct. 26, 2017

(30) Foreign Application Priority Data

Sep. 29, 2014  (SE) ........................................ 1451142
Sep. 29, 2014  (SE) ........................................ 1451144

(51) Int. Cl.
*B60K 6/36*  (2007.10)
*B60W 20/15*  (2016.01)
(Continued)

(52) U.S. Cl.
CPC .............. *B60K 6/365* (2013.01); *B60K 6/445* (2013.01); *B60K 6/543* (2013.01); *B60K 6/547* (2013.01);
(Continued)

(58) Field of Classification Search
None
See application file for complete search history.

(56) References Cited

U.S. PATENT DOCUMENTS 3,744,333 A    7/1973  Hallberg
4,403,968 A    9/1983  Heidrich et al.
(Continued)

FOREIGN PATENT DOCUMENTS

CN  103403392 A  11/2013
CN  103732945 A  4/2014
(Continued)

OTHER PUBLICATIONS

International Search Report for PCT/SE15/051022 dated Dec. 18, 2015.
(Continued)

*Primary Examiner* — Colby M Hansen
(74) *Attorney, Agent, or Firm* — Moore & Van Allen PLLC; W. Kevin Ransom

(57) ABSTRACT

The present invention relates to a hybrid powertrain and method of controlling same, the hybrid powertrain comprising an internal combustion engine; a gearbox with an input and an output shaft; a range gearbox connected to the output shaft; a first planetary gear connected to the input shaft; a second planetary gear connected to the first planetary gear;
(Continued)

a first electrical machine connected to the first planetary gear; a second electrical machine connected to the second planetary gear; one gear pair connected with the first planetary gear and the output shaft; and one gear pair connected with the second planetary gear and the output shaft, wherein the internal combustion engine is connected with the first planetary gear via the input shaft. The range gearbox comprises a third planetary gear with a third sun wheel and a third planetary wheel carrier and a fourth clutch device arranged to connect and disconnect the third sun wheel with/from the third planetary wheel carrier.

20 Claims, 6 Drawing Sheets

(51) Int. Cl.
| | |
|---|---|
| F16H 3/72 | (2006.01) |
| B60W 30/19 | (2012.01) |
| B60K 6/365 | (2007.10) |
| B60K 6/445 | (2007.10) |
| B60K 6/547 | (2007.10) |
| F16H 61/686 | (2006.01) |
| F16H 37/04 | (2006.01) |
| F16H 3/00 | (2006.01) |
| B60K 6/543 | (2007.10) |
| F16H 3/091 | (2006.01) |
| F16H 61/04 | (2006.01) |
| F16H 61/688 | (2006.01) |
| F16H 61/70 | (2006.01) |
| F16H 63/50 | (2006.01) |
| B60W 10/06 | (2006.01) |
| B60W 10/08 | (2006.01) |
| B60W 10/111 | (2012.01) |
| B60W 20/30 | (2016.01) |
| F16H 37/10 | (2006.01) |
| F16H 61/66 | (2006.01) |

(52) U.S. Cl.
CPC .......... *B60W 10/06* (2013.01); *B60W 10/08* (2013.01); *B60W 10/111* (2013.01); *B60W 20/15* (2016.01); *B60W 20/30* (2013.01); *B60W 30/19* (2013.01); *F16H 3/006* (2013.01); *F16H 3/091* (2013.01); *F16H 3/728* (2013.01); *F16H 37/046* (2013.01); *F16H 61/0403* (2013.01); *F16H 61/686* (2013.01); *F16H 61/688* (2013.01); *F16H 61/702* (2013.01); *F16H 63/502* (2013.01); B60W 2710/0644 (2013.01); B60W 2710/083 (2013.01); B60W 2710/1005 (2013.01); B60Y 2200/92 (2013.01); F16H 2003/008 (2013.01); F16H 2037/102 (2013.01); F16H 2061/6602 (2013.01); F16H 2200/201 (2013.01); F16H 2306/44 (2013.01); Y02T 10/6239 (2013.01); Y10S 903/911 (2013.01); Y10S 903/918 (2013.01); Y10S 903/919 (2013.01); Y10S 903/93 (2013.01); Y10S 903/945 (2013.01)

(56) References Cited

U.S. PATENT DOCUMENTS

| | | | | |
|---|---|---|---|---|
| 5,407,401 A | * | 4/1995 | Bullmer | B60W 10/04 477/109 |
| 5,558,595 A | * | 9/1996 | Schmidt | B60K 6/365 477/3 |
| 5,916,050 A | | 6/1999 | Coutant et al. | |
| 6,044,931 A | * | 4/2000 | Reed, Jr. | F16H 3/006 184/6.12 |
| 6,203,463 B1 | | 3/2001 | Casey et al. | |
| 6,371,882 B1 | | 4/2002 | Casey et al. | |
| 6,558,283 B1 | | 5/2003 | Schnelle | |
| 6,811,508 B2 | | 11/2004 | Tumback | |
| 7,128,680 B2 | | 10/2006 | Holmes | |
| 8,231,491 B2 | | 7/2012 | Oba et al. | |
| 8,251,165 B2 | | 8/2012 | Katsuta et al. | |
| 8,257,213 B2 | | 9/2012 | Komada et al. | |
| 9,073,546 B2 | | 7/2015 | Kuroda et al. | |
| 9,528,583 B2 | | 12/2016 | Lubke et al. | |
| 9,770,969 B2 | | 9/2017 | Bjrkman et al. | |
| 9,945,448 B2 | | 4/2018 | Lindstrom et al. | |
| 2003/0166429 A1 | | 9/2003 | Tumback | |
| 2004/0112317 A1 | | 6/2004 | Tumback et al. | |
| 2005/0227803 A1 | | 10/2005 | Holmes | |
| 2005/0279073 A1 | | 12/2005 | Clauss et al. | |
| 2007/0123384 A1 | | 5/2007 | Schon et al. | |
| 2007/0243966 A1 | | 10/2007 | Holmes et al. | |
| 2008/0053723 A1 | | 3/2008 | Kozarekar | |
| 2008/0103002 A1 | | 5/2008 | Holmes | |
| 2008/0125265 A1 | | 5/2008 | Conlon et al. | |
| 2009/0048747 A1 | | 2/2009 | Stridsberg | |
| 2009/0320629 A1 | | 12/2009 | Akashi et al. | |
| 2010/0216584 A1 | | 8/2010 | Lutoslawski | |
| 2011/0202222 A1 | | 8/2011 | Yamamoto | |
| 2012/0021861 A1 | | 1/2012 | Sakai et al. | |
| 2013/0260936 A1 | | 10/2013 | Takei et al. | |
| 2013/0337961 A1 | | 12/2013 | Kaltenbach | |
| 2014/0024490 A1 | | 1/2014 | Bangura et al. | |
| 2014/0046527 A1 | | 2/2014 | Ito et al. | |
| 2014/0150604 A1 | | 6/2014 | Kaltenbach | |
| 2014/0194238 A1 | | 7/2014 | Ono et al. | |
| 2015/0038286 A1 | | 2/2015 | Hane | |
| 2015/0072823 A1 | * | 3/2015 | Rintoo | F16H 61/0403 475/72 |
| 2015/0158484 A1 | | 6/2015 | Sato et al. | |
| 2015/0167794 A1 | | 6/2015 | Morio et al. | |
| 2015/0184726 A1 | | 7/2015 | Rekow et al. | |
| 2015/0292606 A1 | | 10/2015 | Lubke et al. | |
| 2015/0292610 A1 | * | 10/2015 | Rintoo | F16H 3/728 475/72 |
| 2016/0264127 A1 | | 9/2016 | Nilsson et al. | |
| 2017/0015299 A1 | | 1/2017 | Björkman et al. | |
| 2017/0015300 A1 | | 1/2017 | Lindström et al. | |
| 2017/0015303 A1 | | 1/2017 | Björkman et al. | |
| 2017/0015304 A1 | | 1/2017 | Björkman et al. | |
| 2017/0015305 A1 | | 1/2017 | Björkman et al. | |
| 2017/0015306 A1 | | 1/2017 | Björkman et al. | |
| 2017/0021819 A1 | | 1/2017 | Lindström et al. | |
| 2017/0166202 A1 | | 6/2017 | Kobayashi et al. | |
| 2017/0282700 A1 | | 10/2017 | Bergquist et al. | |
| 2017/0305256 A1 | | 10/2017 | Bergquist et al. | |
| 2018/0339698 A1 | | 11/2018 | Hock et al. | |

FOREIGN PATENT DOCUMENTS

| | | |
|---|---|---|
| DE | 10021025 A1 | 11/2001 |
| DE | 102005040153 A1 | 3/2007 |
| DE | 102007022129 A1 | 11/2008 |
| DE | 102008043732 A1 | 6/2009 |
| DE | 102011005028 A1 | 9/2012 |
| DE | 102011080068 A1 | 1/2013 |
| DE | 102011080069 A1 | 1/2013 |
| DE | 102012220063 A1 | 5/2014 |
| DE | 102005049992 | 1/2017 |
| EP | 0724977 A1 | 8/1996 |
| SE | 1350392 A1 | 9/2014 |
| SE | 1350394 A1 | 9/2014 |
| SE | 1450305 A1 | 9/2014 |
| SE | 1450306 A1 | 9/2014 |
| SE | 1450308 A1 | 9/2014 |
| WO | 2008046185 A1 | 4/2008 |
| WO | 2014158073 A1 | 3/2014 |
| WO | WO2014067734 A1 | 5/2014 |

(56) References Cited

FOREIGN PATENT DOCUMENTS

WO    2014158074 A1    10/2014
WO    2014158076 A1    10/2014

OTHER PUBLICATIONS

Written Opinion of the International Searching Authority for PCT/SE15/051022 dated Dec. 18, 2015.
International Preliminary Report on Patentability for PCT/SE2015/051022 dated Apr. 4, 2017.
Korean Search Report for Korean Patent Application No. 10-2017-7010538 dated Apr. 9, 2018.
First Office Action of Chinese International Patent Application No. 201580051094.8 by the State Intellectual Property Office of the People's Republic of China dated Apr. 7, 2018.
Chinese Office Action for Chinese Application No. 201580051094.8 dated Jul. 4, 2018.
Scania CV AB, Chinese Application No. 201580051094.8, Second Office Action, dated Mar. 27, 2019.
Scania CV AB, Swedish Application No. 1451142-2, Office Action, dated May 28, 2015.
Scania CV AB, Swedish Application No. 1451144-8 Office Action, dated May 22, 2015.
Scania CV AB, Chinese Application No. 201580051094.8, Third Office Action, dated Sep. 6, 2019.

* cited by examiner

HYBRID POWERTRAIN, METHOD FOR CONTROLLING SUCH A HYBRID POWERTRAIN, VEHICLE COMPRISING SUCH A HYBRID POWERTRAIN, COMPUTER PROGRAM FOR CONTROLLING SUCH A HYBRID POWERTRAIN, AND A COMPUTER PROGRAM PRODUCT COMPRISING PROGRAM CODE

CROSS-REFERENCE TO RELATED APPLICATION(S)

This application is a national stage application (filed under 35 § U.S.C. 371) of PCT/SE2015/051022, filed Sep. 29, 2015 of the same title, which, in turn claims priority to Swedish Application Nos. 1451144-8 and 1451142-2 both filed Sep. 29, 2014 of the same title; the contents of each of which are hereby incorporated by reference.

FIELD OF THE INVENTION

The present invention relates to a hybrid powertrain for a vehicle and a method to control same.

BACKGROUND OF THE INVENTION

Hybrid vehicles may be driven by a primary engine, which may be an internal combustion engine, and a secondary engine, which may be an electrical machine. The electrical machine is equipped with at least one energy storage device, such as an electrochemical energy storage device, for storage of electric power and control equipment to control the flow of electric power between the energy storage device and the electrical machine. The electrical machine may thus alternately operate as an engine and as a generator, depending on the vehicle's operating mode. When the vehicle is braked, the electrical machine generates electric power, which is stored in the energy storage device. This is usually referred to as regenerative braking, which entails that the vehicle is decelerated with the help of the electrical machine and the internal combustion engine. The stored electric power is used later for operation of the vehicle.

A gearbox in a hybrid vehicle may comprise a planetary gear. The planetary gear usually comprises three components, which are rotatably arranged in relation to each other, namely a sun wheel, a planetary wheel carrier and an internal ring gear. With knowledge about the number of teeth in the sun wheel and the ring gear, the mutual rotational speeds of the three components may be determined during operation. One of the components of the planetary gear may be connected with an output shaft in an internal combustion engine. This component of the planetary gear thus rotates with a rotational speed corresponding to the rotational speed of the output shaft in the internal combustion engine. A second component in the planetary gear may be connected with an input shaft to a transmission device. This component of the planetary gear thus rotates with the same rotational speed as the input shaft to the transmission device. A third component in the planetary gear is used to achieve hybrid operation, connected with a rotor in an electrical machine. This component in the planetary gear thus rotates with the same rotational speed as the rotor of the electrical machine, if they are directly connected with each other. Alternatively, the electrical machine may be connected with the third component of the planetary gear via a transmission that has a gearing. In this case, the electrical machine and the third component in the planetary gear may rotate with different rotational speeds. The engine speed and/or the torque of the electrical machine may be controlled steplessly. During operating modes when the input shaft to the transmission device must be provided with a rotational engine speed and/or torque, a control device having knowledge about the engine speed of the internal combustion engine calculates the rotational speed with which the third component must be operated, in order for the input shaft to the transmission device to obtain the desired rotational speed. A control device activates the electrical machine in such a manner that it provides the third component with the calculated rotational speed, and thus the input shaft to the transmission device with the desired rotational speed.

By connecting the internal combustion engine's output shaft, the electrical machine's rotor and the transmission device's input shaft with a planetary gear, the conventional clutch mechanism may be avoided. At acceleration of the vehicle, an increased torque must be delivered from the internal combustion engine and the electrical machine to the transmission device, and further to the vehicle's driving wheels. Since both the internal combustion engine and the electrical machine are connected with the planetary gear, the largest possible torque delivered by the internal combustion engine and the electrical machine will be limited by one of these drive units; i.e. the one whose maximum torque is lower than the other drive unit's maximum torque, having regard to the gearing between them. In case the electrical machine's highest torque is lower than the internal combustion engine's highest torque, having regard to the gearing between them, the electrical machine will not be able to generate a sufficiently large reaction torque to the planetary gear, entailing that the internal combustion engine may not transfer its highest torque to the transmission device and further to the vehicle's driving wheels. Thus, the highest torque that may be transferred to the transmission device is limited by the electrical machine's strength. This is also apparent from the so-called planet equation.

Using a conventional clutch, which disconnects the gearbox's input shaft from the internal combustion engine during shifting processes in the gearbox, entails disadvantages, such as heating of the clutch discs, resulting in wear of the clutch discs and an increased fuel consumption. A conventional clutch mechanism is also relatively heavy and costly. It also occupies a relatively large space in the vehicle.

In a vehicle, the space available for the drive arrangement is often limited. If the drive arrangement comprises several components, such as an internal combustion engine, an electrical machine, a gearbox and a planetary gear, the construction must be compact. If there are additional components, such as a regenerative braking device, the requirements that the component parts must have a compact construction are even more stringent. At the same time, the component parts in the drive arrangement must be designed with dimensions that are able to absorb the required forces and torque.

For some types of vehicles, especially heavy goods vehicles and buses, a large number of gear steps is required. Thus, the number of component parts in the gearbox increases, which must also be dimensioned to be able to absorb large forces and torque arising in such heavy goods vehicles. This results in an increase of the size and weight of the gearbox.

There are also requirements for high reliability and high operational security of the components comprised in the drive device. In case the gearbox comprises multi-plate clutches, a wear arises, which impacts the reliability and life of the gearbox.

At regenerative braking, kinetic energy is converted into electric power, which is stored in an energy storage device, such as accumulators. One factor impacting on the life of the energy storage device is the number of cycles in which the energy storage device provides and extracts power to and from the electrical machines. The more cycles, the shorter the life of the energy storage device.

Under some operating conditions, it is desirable to shut off the internal combustion engine, with the objective of saving fuel and to avoid cooling down of the internal combustion engine's exhaust treatment system. The vehicle is then driven by the electrical machine. When a torque addition is required in the hybrid powertrain, or when the energy storage device must be charged, the internal combustion engine must be started quickly and efficiently.

A large torque is required to operate a heavy goods vehicle. Especially during the starting process and also under certain operating conditions, such as driving on an uphill slope, a large torque must be supplied to the driving shafts of the vehicle. In a hybrid vehicle, both the combustion engine and the electrical machine may generate a torque to the vehicle's driving shafts simultaneously. However, it has turned out that the torque that is generated jointly by the combustion engine and the electrical machine is insufficient to propel the vehicle in all operating conditions.

Conventional heavy goods vehicles may be equipped with a range gearbox, which considerably gears up the torque from the vehicle's combustion engine to the driving shafts. Such a range gearbox doubles the number of gearing possibilities and usually comprises a planetary gear, with a low and a high gear, respectively, with which the gearing possibilities of the main gearbox may be divided into a low range position and a high range position. In the low range position, a gear reduction occurs through the planetary gear, and in the high range position the gear ratio is 1:1 through the planetary gear.

The document EP-B1-1126987 shows a gearbox with double planetary gears. The sun wheel of each planetary gear is connected to an electrical machine, and the internal ring gears of the planetary gears are connected with each other. The planetary wheel carrier in each planetary gear is connected to a number of gear pairs, so that an infinite number of gear steps is obtained. Another document, EP-B1-1280677, also shows how the planetary gears may be bridged with a gear step arranged on the internal combustion engine's output shaft.

Document US-A1-20050227803 shows a vehicle transmission with two electrical machines, connected to the respective sun wheels in two planetary gears. The planetary gears have a common planetary wheel carrier, which is connected to the transmission's input shaft.

The document WO2008/046185-A1 shows a hybrid transmission with two planetary gears, wherein one electrical machine is connected to one of the planetary gears and a double clutch interacts with the second planetary gear. Both planetary gears also interact with each other via a cogwheel transmission.

SUMMARY OF THE INVENTION

Despite prior art solutions in the field, there is a need to further develop a method to control such a hybrid powertrain, in order to achieve gear shifts without any torque interruption and optimal brake regeneration, as well as to achieve a large torque and a large number of gear steps.

The objective of the invention is to provide a hybrid powertrain, which facilitates shifting with a range gearbox without torque interruption and without the use of an energy storage device. The objective is also to provide a novel and advantageous method to control a hybrid powertrain, in order to achieve a shift operation without torque interruption and optimal brake regeneration, as well as to achieve a large torque and a large number of gear steps.

Another objective of the invention is to provide a novel and advantageous computer program to control a hybrid powertrain.

With the hybrid powertrain according to the invention, an efficient and reliable gear shift without any torque interruption is achieved. The hybrid powertrain comprises an internal combustion engine; a gearbox with an input shaft and an output shaft; a range gearbox, connected to the output shaft; a first planetary gear, connected to the input shaft; a second planetary gear, connected to the first planetary gear; a first electrical machine, connected to the first planetary gear; a second electrical machine, connected to the second planetary gear; at least one gear pair, connected with the first planetary gear and the output shaft; and at least one gear pair, connected with the second planetary gear and the output shaft, wherein the internal combustion engine is connected with the first planetary gear via the input shaft. The range gearbox comprises a third planetary gear with a third sun wheel and a third planetary wheel carrier, and a fourth clutch device is arranged to connect and disconnect the third sun wheel with/from the third planetary wheel carrier. The range gearbox shifts the torque up to the driving shafts. The range gearbox also doubles the number of gearing possibilities, while the hybrid powertrain is kept compact in order to be less bulky with a limited weight. By connecting the third sun wheel with the third planetary wheel carrier via the fourth clutch device, a gear in the high range position may be obtained. The third planetary wheel carrier is suitably connected with the output shaft. Thus, when the third sun wheel is connected with the third planetary wheel carrier via the fourth clutch device, the sun wheel obtains the same rotational speed as the output shaft.

The first planetary gear is suitably connected to a first main shaft. The second planetary gear is suitably connected to a second main shaft. A countershaft is suitably arranged between the respective first and second planetary gear and the output shaft. The countershaft is suitably arranged between the respective first and second main shaft and the output shaft. The countershaft is preferably connected with the output shaft via the range gearbox.

The fourth clutch device suitably comprises a splines-equipped clutch sleeve, which is axially shiftable on the third sun wheel and the third planetary wheel carrier. The third planetary wheel carrier is suitably connected with the output shaft. By connecting the third sun wheel and the third planetary wheel carrier in the range gearbox a high range position may be achieved.

An input shaft arranged with the range gearbox is suitably connected with the third sun wheel in the third planetary gear. Torque may be transmitted to and from the range gearbox's third sun wheel via the input shaft.

A fifth gear pair is suitably arranged between the countershaft and the input shaft to the range gearbox. The fifth gear pair suitably comprises a fifth and sixth cogwheel in engagement with each other, which fifth cogwheel is arranged in such a manner so that it may be connected with and disconnected from the countershaft via a fifth clutch element. The sixth cogwheel is suitably fixedly arranged on the input shaft of the range gearbox. It is also possible to arrange the sixth cogwheel on the range gearbox's input shaft in such a manner that it may be connected and disconnected.

A sixth gear pair is suitably arranged between the countershaft and the third planetary wheel carrier. The sixth gear pair preferably comprises a seventh cogwheel and an eight cogwheel arranged with the third planetary wheel carrier, in engagement with each other, which seventh cogwheel is arranged in such a way that it may be connected with and disconnected from the countershaft. By connecting the sixth gear pair to the countershaft, a high range position may be achieved. Accordingly, there are additional possibilities of transmitting torque through the range gearbox in the hybrid powertrain.

According to one embodiment, a third clutch unit is arranged to connect, in a releasable manner, a ring gear arranged in the third planetary gear, with a gearbox house in a low range position. Preferably, the third clutch unit consists of a shiftable sleeve, which is maneuvered by a shift fork.

The first planetary gear is suitably connected to the input shaft and a first shaft. The second planetary gear is suitably connected to a second main shaft. The at least one gear pair connected with the first planetary gear and the output shaft is suitably arranged between the first main shaft and the countershaft. The at least one gear pair connected with the second planetary gear and the output shaft is suitably arranged between the second main shaft and the countershaft.

According to one embodiment a clutch device is arranged between the internal combustion engine and the gearbox, so that the internal combustion engine may be disconnected from the gearbox and the hybrid powertrain may be operated electrically with the first and the second electrical machine. It is important that the internal combustion engine's output shaft is as still as possible during electric drive. If torque is transferred to the internal combustion engine when it is switched off, there is a risk that the shafts of the internal combustion engine move against bearings without any supply of oil, which may result in the destruction of the bearings. The clutch device ensures that the internal combustion engine's output shaft is as still as possible. When the clutch device is open, the internal combustion engine is thus disconnected from the gearbox, and when the clutch device is closed, the internal combustion engine is connected with the gearbox.

According to one embodiment, a method is provided to control a hybrid powertrain in order to achieve a shift to a high range position without torque interruption. The hybrid powertrain comprises an internal combustion engine; a gearbox with an input shaft and an output shaft; a range gearbox, connected to the output shaft; a first planetary gear, connected to the input shaft; a second planetary gear, connected to the first planetary gear; a first electrical machine, connected to the first planetary gear; a second electrical machine, connected to the second planetary gear; at least one gear pair, connected with the first planetary gear and the output shaft; and at least one gear pair, connected with the second planetary gear and the output shaft, wherein the internal combustion engine is connected with the first planetary gear via the input shaft, and wherein the range gearbox comprises a third planetary gear with a third sun wheel and a third planetary wheel carrier, and wherein a fourth clutch device is arranged to connect and disconnect the third sun wheel with/from the third planetary wheel carrier. By a) ensuring that two rotatable components in the first planetary gearbox are connected; b) ensuring that the at least one gear pair, connected with the second planetary gear and the output shaft, is connected; c) ensuring that the first planetary gear is connected with an input shaft to the range gearbox via a clutch mechanism; d) ensuring that the fourth clutch device is controlled in such a manner that the third sun wheel and the third planetary wheel carrier are disconnected from each other; e) connecting a sixth gear pair, arranged between a countershaft and the range gearbox, to the countershaft in such a manner so that the countershaft is connected with the output shaft, via the range gearbox; f) disconnecting a rotatable component in the range gearbox from a gearbox house, which at least partly surrounds the range gearbox; and g) connecting two rotatable components in the second planetary gear, a control of the hybrid powertrain is achieved, so that a gear step to a high range position is obtained without any torque interruption. The hybrid powertrain is thus propelled in a high range gear.

The range gearbox suitably comprises a third planetary gear with a third sun wheel, a third planetary wheel carrier and a third ring gear.

The method suitably comprises the additional step, after step f) and before step g):

h) controlling the internal combustion engine in such a manner that a synchronous rotational speed arises between two rotatable components in the second planetary gearbox. In this manner, the two rotatable components may easily be connected via a second clutch device in step f).

Suitably, the method is carried out when propulsion takes place in a gear in a low range position. Thus, a rotatable component in a range gearbox is prevented from rotating. By preventing the rotation of a rotatable component in the range gearbox, a low range position is achieved. The third ring gear, arranged in the third planetary gear, is suitably connected with a gearbox house and is thus prevented from rotating. This ensures that the range gearbox is in a low range position. Performing the method steps a)-c) ensures that propulsion is via a gear in a low range position, from which shifting to a high range position is possible without any torque interruption.

Preferably the step f) comprises disconnecting the third ring gear in the range gearbox from the gearbox house, which at least partly surrounds the range gearbox. By disconnecting the rotatable component in the range gearbox from the gearbox house, so that it is allowed to rotate, the range gearbox is no longer in a low range position. Since the sixth gear pair was previously connected to the countershaft in step e), at the same time as the third sun wheel and the third planetary wheel carrier are disconnected from each other, the disconnection of the rotatable component in the range gearbox also entails that the range gearbox obtains a high range position. By disconnecting the third sun wheel and the third planetary wheel carrier from each other, a shift operation from a low range position to a high range position may be achieved, without the need for synchronization of the range gearbox.

Suitably, the steps f) and g) comprise generating a driving torque with the second electrical machine. The sixth gear pair preferably comprises a seventh cogwheel and an eight cogwheel arranged with the third planetary wheel carrier, in engagement with each other, which seventh cogwheel is arranged in such a manner that it may be connected with and disconnected from the countershaft. The third planetary wheel carrier is also connected with the output shaft. By way of the method steps f) and g), a torque is thus obtained in the output shaft with the use of the second electrical machine, via the gear pair connected with the second planetary gear, to the countershaft and further, via the sixth gear pair, to the range gearbox's third planetary wheel carrier, and finally to the output shaft.

Preferably, step e) comprises connection of the sixth gear pair to the countershaft by way of controlling the second electrical machine in such a manner that a synchronous rotational speed arises between the countershaft and a seventh cogwheel, arranged in the sixth gear pair on the countershaft.

According to one embodiment, the steps e)-f) comprise that the second electrical machine is operated by the electric power generated by the first electrical machine—This is suitably achieved by way of controlling the first electrical machine in such a way that it impacts the internal combustion engine with a negative torque. The internal combustion engine is controlled to increase its torque corresponding to the negative torque, and the first electrical machine may thus generate power to operate the second electrical machine. In this manner, a shift to a high range position is achieved without torque interruption, without synchronization devices, and without the use of any energy storage device.

When the steps a)-g) have been completed, the hybrid powertrain is driven in a gear in a high range position, wherein the high range position has been obtained by disconnecting the rotatable component in the range gearbox from the gearbox house, disconnecting the third sun wheel and the third planetary wheel carrier from each other, and by connecting the sixth gear pair. By connecting the third sun wheel and the third planetary wheel carrier, additional gears in the high range position may be achieved. Thus, the hybrid powertrain entails that gears in a high range position may be achieved in two different manners, both by connecting two rotatable components in the range gearbox with each other and by disconnecting the range gearbox and connecting the sixth gear pair.

In order to achieve additional gears in the high range position, the method according to the invention suitably comprises the additional steps, after step g):

i) ensuring that all rotatable components of the second planetary gear are disconnected from each other;

j) controlling the first electrical machine in such a way that the third sun wheel in the range gearbox, which is connected with the input shaft to the range gearbox, is controlled towards a rotational speed which is synchronous with the output shaft; and k) connecting the third sun wheel with the third planetary wheel carrier in the range gearbox via the fourth clutch device.

By disconnecting the first planetary gear's rotatable components, the first electrical machine may then be controlled in order to achieve a synchronous rotational speed between the third sun wheel and the output shaft. When a synchronous rotational speed has been obtained, the third sun wheel and the third planetary wheel carrier may be connected with the use of the fourth clutch device. In this manner, the hybrid powertrain is adjusted for additional gear steps in the high range position, without any torque interruption and without any synchronising devices.

According to one embodiment of the invention the method also comprises the step, after the step k):

l) disconnecting the first planetary gearbox from the input shaft of the range gearbox via the clutch mechanism.

Since the first planetary gear's rotatable components are disconnected from each other and a synchronous rotational speed has been obtained between the third sun wheel and the output shaft, it is suitable subsequently to shift the clutch mechanism between the input shaft's range gearbox and the first planetary gear when a torque free state has been achieved, so that the first planetary gear and the range gearbox's input shaft are no longer connected. Accordingly, gears in the high range position may be achieved, where the torque to the output shaft is transmitted via the countershaft and this sixth gear pair, at the same time as the first planetary gear and the input shaft of the range gearbox are disconnected from each other.

The method may also comprise the additional steps, after step l):

m) connecting the at least one gear pair connected with the first planetary gearbox and the output shaft;

n) disconnecting the rotatable components in the second planetary gear; and o) connecting the rotatable components in the first planetary gear.

This achieves engagement of an additional gear in the high range position.

Furthermore, the method may comprise disconnection of the sixth gear pair from the countershaft, and reconnection of the first planetary gear and the input shaft of the range gearbox with the use of the clutch mechanism. By ensuring that the third sun wheel and the third planetary wheel carrier are connected with the use of the fourth clutch device, the sixth gear pair may be disconnected and the input shaft of the range gearbox may be connected with the first planetary gear without any torque interruption. Accordingly, a shift to a high range position may be achieved without any torque interruption.

According to one embodiment, the at least one gear pair connected with the first planetary gear comprises a pinion gear and a cogwheel engaged with each other, which pinion gear is fixedly arranged with the first planetary gear, and which cogwheel may be connected with and disconnected from the countershaft, wherein step b) comprises ensuring that the cogwheel is disconnected from the countershaft.

According to one embodiment, the at least one gear pair connected with the second planetary gear comprises a pinion gear and a cogwheel engaged with each other, which pinion gear is fixedly arranged with the second planetary gear, and which cogwheel may be connected with and disconnected from the countershaft, wherein step b) comprises ensuring that the cogwheel is connected to the countershaft.

According to one embodiment, a fifth gear pair comprises a fifth and sixth cogwheel in engagement with each other, which fifth cogwheel is arranged so that it may be connected with and disconnected from the countershaft with the use of a fifth clutch element, wherein step b) comprises ensuring that the fifth cogwheel is disconnected from the countershaft.

The connection of two rotatable components in the first planetary gear facilitates a transfer of torque generated by the internal combustion engine and/or the first electrical machine, via the first planetary gearbox to the first main shaft and thus further along to the output shaft. The connection of two rotatable components in the second planetary gear facilitates transfer of torque generated by the internal combustion engine and/or the second electrical machine, via the second planetary gear to the second main shaft and thus further along to the output shaft.

Suitably, step a) comprises ensuring that a first sun wheel in the first planetary gear and a first planetary wheel carrier in the first planetary gear are connected via a first clutch device. Further, step g) suitably comprises connection of a second sun wheel in the second planetary gear and a second planetary wheel carrier in the second planetary gear via a second clutch unit.

The clutch devices and the locking mechanisms preferably comprise an annular sleeve, which is shifted axially between a connected and a disconnected state. The sleeve encloses, substantially concentrically, the gearbox's rotating components and is moved between the connected and disconnected state with a power element. Thus, a compact construction is obtained, with a low weight and a low manufacturing cost.

In order to connect, with the use of the first and the second clutch device, respectively, the sun wheel and the planetary wheel carrier of the respective planetary gear, the internal combustion engine and/or the first electrical machine and/or the second electrical machine is controlled in such a way that a synchronous rotational speed is achieved between the sun wheel and the planetary wheel carrier. When a synchronous rotational speed has been achieved, the clutch device is shifted, so that the sun wheel and the planetary wheel carrier become mechanically connected with each other.

In order to disconnect the sun wheel and the planetary wheel carrier in the respective planetary gear, the first and/or second electrical machine is controlled in such a way that torque balance is achieved in the planetary gear. When torque balance has been achieved, the clutch device is shifted, so that the sun wheel and the planetary wheel carrier are no longer mechanically connected with each other.

Torque balance relates to a state where a torque acts on an internal ring gear arranged in the planetary gear, representing the product of the torque acting on the planetary wheel carrier of the planetary gear and the gear ratio of the planetary gear, while simultaneously a torque acts on the planetary gear's sun wheel, representing the product of the torque acting on the planetary wheel carrier and (1—the planetary gear's gear ratio). In the event two of the planetary gear's component parts, i.e. the sun wheel, the internal ring gear or planetary wheel carrier, are connected with the use of a clutch device, this clutch device does not transfer any torque between the planetary gear's parts when torque balance prevails. Accordingly, the clutch device may easily be shifted and the planetary gear's component parts may be disconnected.

BRIEF DESCRIPTION OF THE DRAWINGS

Below is a description, as an example, of preferred embodiments of the invention with reference to the enclosed drawings, on which.

DETAILED DESCRIPTION OF THE INVENTION

Figure 1:
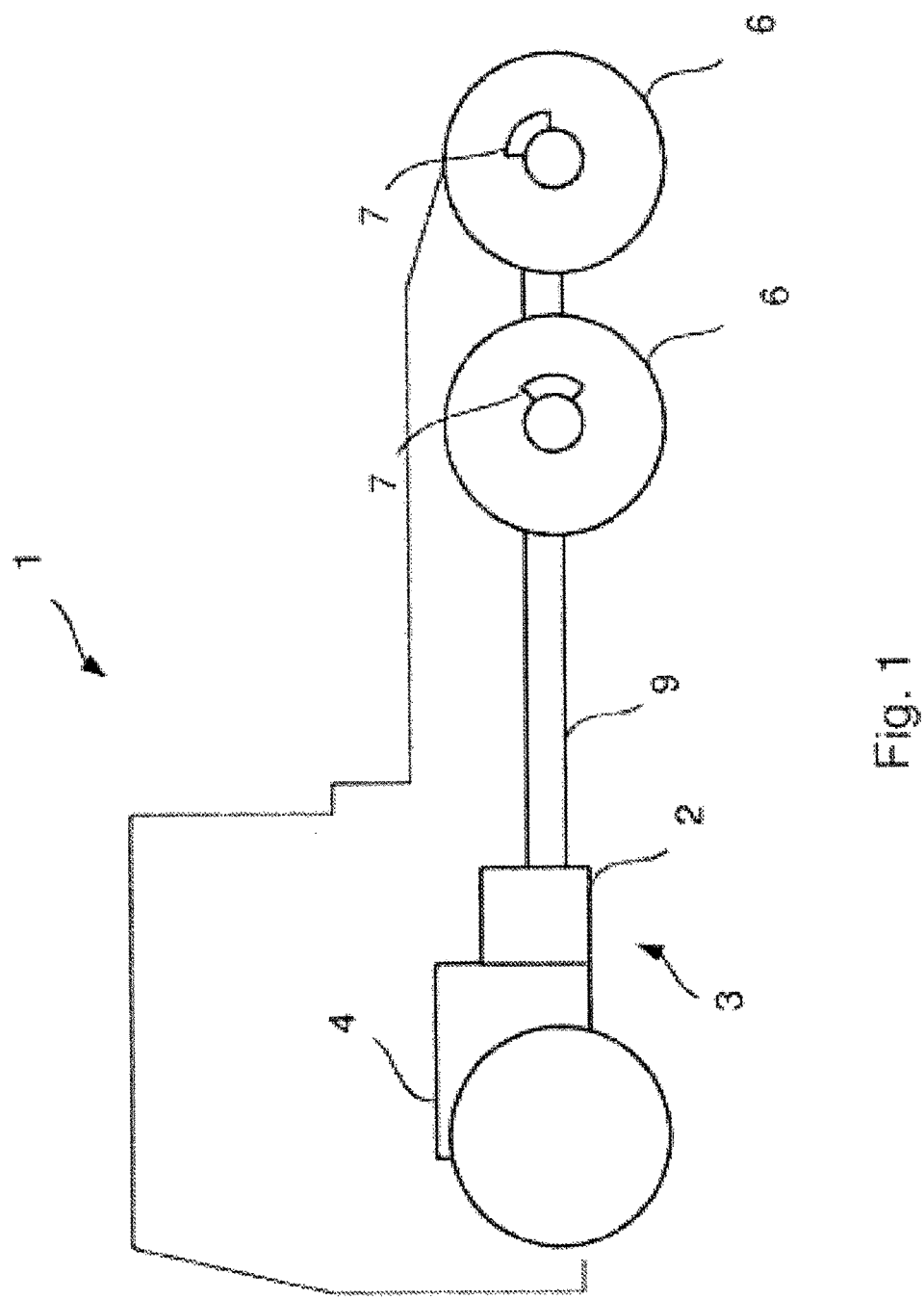
FIG. 1 shows a schematic side view of a vehicle, with an internal combustion engine and a hybrid powertrain according to the present invention.

FIG. 1 shows a schematic side view of a vehicle 1, comprising a gearbox 2 and an internal combustion engine 4, which are comprised in a hybrid powertrain 3. The internal combustion engine 4 is connected to the gearbox 2, and the gearbox 2 is further connected to the driving wheels 6 of the vehicle 1 via a propeller shaft 9. The driving wheels 6 are equipped with brake devices 7 to brake the vehicle 1.

Figure 2A:
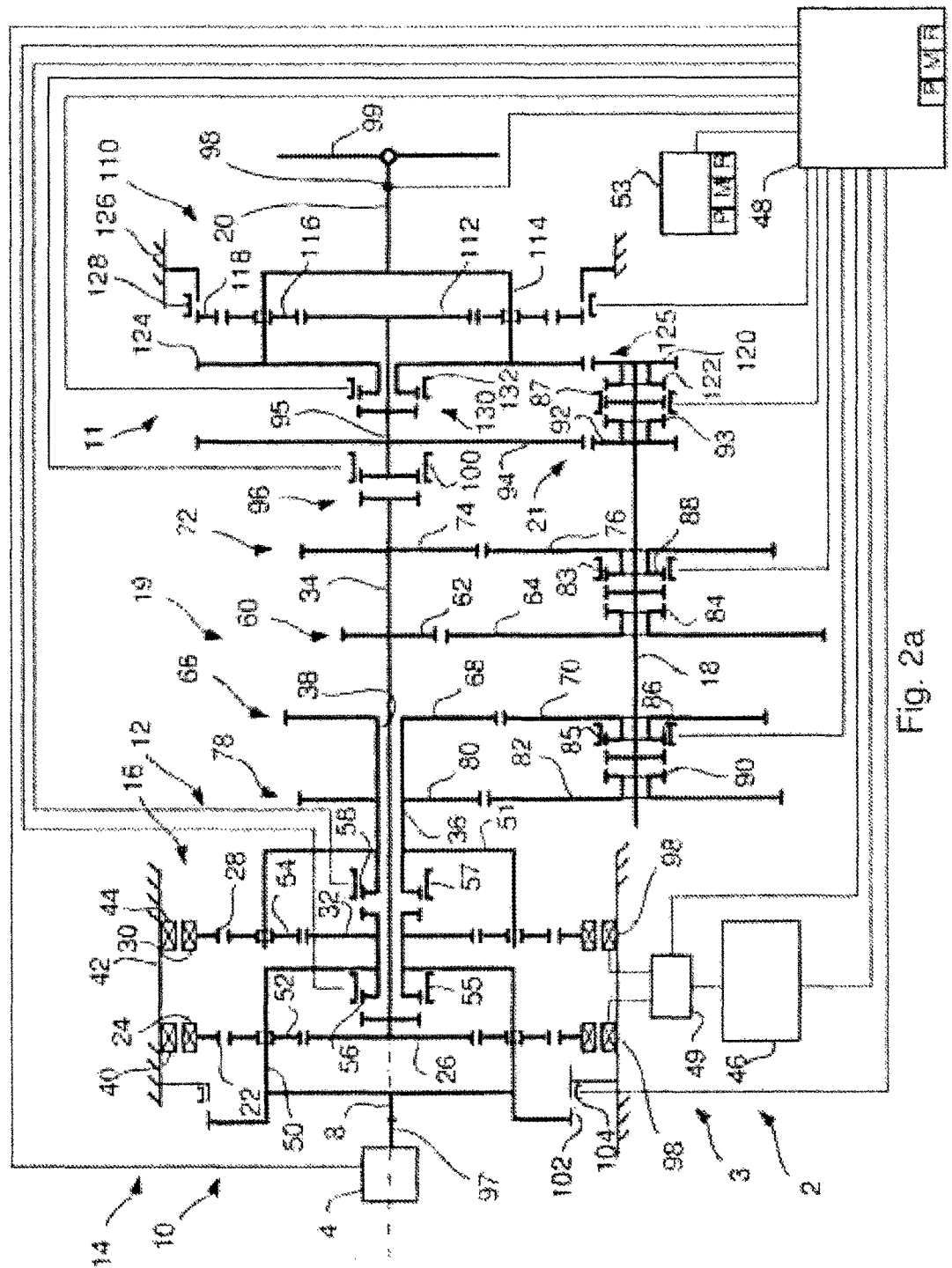
FIG. 2a-b shows schematic side views of a hybrid powertrain according to the present invention.

FIG. 2a shows a schematic side view of a hybrid powertrain 3 according to a first embodiment. The hybrid powertrain 3 is equipped with a gearbox 2, comprising an input shaft 8, a first and a second planetary gear 10 and 12, respectively, a first and a second electrical machine 14 and 16, respectively, a countershaft 18, a range gearbox 11 and an output shaft 20. The first planetary gear 10 has a first internal ring gear 22, to which a first rotor 24 in the first electrical machine 14 is connected. The first planetary gear 10 also has a first sun wheel 26. The second planetary gear 12 has a second internal ring gear 28, to which a second rotor 30 of the second electrical machine 16 is connected. The second planetary gear 12 has a second sun wheel 32. The first and the second sun wheels 26 and 32, respectively, are coaxially arranged, which, according to the embodiment displayed, entails that a first main shaft 34 arranged on the first sun wheel 26 extends inside a second main shaft 36, which is equipped with a central boring 38, arranged on the second sun wheel 32. It is also possible to arrange the first main shaft 34 in parallel with and next to the second main shaft 36.

The first electrical machine 14 is equipped with a first stator 40, which is connected to the vehicle 1, via a gear housing 42 surrounding the gearbox 2. The second electrical machine 16 is equipped with a second stator 44, which is connected to the vehicle 1, via a gear housing 42 surrounding the gearbox 2. The first and the second electrical machine 16 are connected to an energy storage device 46, such as a battery, which, depending on the vehicle's 1 operating mode, operates the electrical machines 14 and 16. At other operating modes, the electrical machines 14 and 16, respectively, may work as generators, whereat power is supplied to the energy storage device 46. An electronic control device 48 is connected to the energy storage device 46 and controls the supply of power to the electrical machines 14 and 16. Preferably the energy storage device 46 is connected to the electrical machines 14 and 16, respectively, via a switch 49, which is connected to the control device 48. In some operating modes, the electrical machines 14 and 16, respectively, may also operate each other. Electric power is then led from one of the electrical machines 14, 16 to the second electrical machine 14, 16 via the switch 49, connected to the electrical machines 14, 16. Thus, it is possible to achieve a power balance between the electrical machines 14, 16. Another computer 53 may also be connected to the control device 48 and the gearbox 2.

The first planetary gear 10 is equipped with a first planetary wheel carrier 50, on which a first set of planetary wheels 52 is mounted. The second planetary gear 12 is equipped with a second planetary wheel carrier 51, on which a second set of planetary wheels 54 is mounted. The first set of planetary wheels 52 interacts with the first internal ring gear 22 and the first sun wheel 26. The second set of planetary wheels 54 interacts with the second internal ring gear 28 and the second sun wheel 32. The input shaft 8 of the gearbox 2 is connected with the first planetary wheel carrier 50.

A first clutch device 56 is arranged between the first sun wheel 26 and the first planetary wheel carrier 50. By arranging the first clutch device 56 in such a way that the first sun wheel 26 and the first planetary wheel carrier 50 are connected with each other, and may therefore not rotate in relation to each other, the first planetary wheel carrier 50 and the first sun wheel 26 will rotate with equal rotational speeds.

A second clutch device 58 is arranged between the second sun wheel 32 and the second planetary wheel carrier 51. By arranging the second clutch device 58 in such a way that the second sun wheel 32 and the second planetary wheel carrier 51 are connected with each other, and may therefore not rotate in relation to each other, the second planetary wheel carrier 51 and the first sun wheel 32 will rotate with equal rotational speeds.

Preferably, the first and second clutch devices 56, 58 comprise a first and a second splines-equipped clutch sleeve 55 and 57, respectively, which is axially shiftable on a splines-equipped section on the first and second, respectively, planetary wheel carrier 50 and 51, and on a splines-equipped section on the respective sun wheels 26 and 32. By shifting the respective clutch sleeve 55, 57 in such a way that the splines-equipped sections are connected via the respective clutch sleeves 55, 57, the first planetary wheel carrier 50 and the first sun wheel 26, as well as the second planetary wheel carrier 51 and the second sun wheel 32, respectively, become mutually interlocked with each other and may not rotate in relation to each other.

The first and second clutch device 56, 58 according to the embodiment displayed in FIG. 2 are arranged between the first sun wheel 26 and the first planetary wheel carrier 50, and between the second sun wheel 28 and the second planetary wheel carrier 51, respectively. However, it is possible to arrange an additional or alternative clutch device (not displayed) between the first internal ring gear 22 and the first planetary wheel carrier 50, and also to arrange an additional or alternative clutch device (not displayed) between the second internal ring gear 28 and the second planetary wheel carrier 51.

A transmission device 19, which comprises a first gear pair 60, arranged between the first planetary gear 10 and the output shaft 20 is connected to the first and the second main shaft 34, 36. The first gear pair 60 comprises a first pinion gear 62 and a first cogwheel 64, which are in engagement with each other. A second gear pair 66 is arranged between the second planetary gear 12 and the output shaft 20. The second gear pair 66 comprises a second pinion gear 68 and a second cogwheel 70, which are in engagement with each other. A third gear pair 72 is arranged between the first planetary gear 10 and the output shaft 20. The third gear pair 72 comprises a third pinion gear 74 and a third cogwheel 76, which are in engagement with each other. A fourth gear pair 78 is arranged between the second planetary gear 12 and the output shaft 20. The fourth gear pair 78 comprises a fourth pinion gear 80 and a fourth cogwheel 82, which are in engagement with each other.

On the first main shaft 34, the first and the third pinion gears 62 and 74, respectively, are arranged. The first and the third pinion gears 62 and 74, respectively, are fixedly connected with the first main shaft 34, so that they may not rotate in relation to the first main shaft 34. On the second main shaft 36, the second and the fourth pinion gears 68 and 80, respectively, are arranged. The second and the fourth pinion gears 68 and 80, respectively, are fixedly connected with the second main shaft 36, so that they may not rotate in relation to the second main shaft 36.

The countershaft 18 extends substantially in parallel with the first and the second main shaft 34 and 36, respectively. On the countershaft 18, the first, second, third and fourth cogwheels 64, 70, 76 and 82, respectively, are mounted. The first pinion gear 62 engages with the first cogwheel 64, the second pinion gear 68 engages with the second cogwheel 70, the third pinion gear 74 engages with the third cogwheel 76 and the fourth pinion gear 80 engages with the fourth cogwheel 82.

The first, second, third and fourth cogwheels 64, 70, 76 and 82, respectively, may be individually locked with and released from the countershaft 18 with the assistance of the first, second, third and fourth clutch elements 84, 86, 88 and 90, respectively. The clutch elements 84, 86, 88 and 90, respectively, preferably consist of splines-equipped sections on the cogwheels 64, 70, 76 and 82, respectively, and on the countershaft 18, which interact with the fifth and sixth clutch sleeves 83, 85 which engage mechanically with the splines-equipped sections of the respective first to fourth cogwheel 64, 70, 76 and 82 and of the countershaft 18. The first and third clutch elements 84, 88 are preferably equipped with a common clutch sleeve 83, and the second and fourth clutch elements 86, 90 are preferably equipped with a common clutch sleeve 85. In the released state, a relative rotation may occur between the respective cogwheels 64, 70, 76 and 82 and the countershaft 18. The clutch elements 84, 86, 88 and 90, respectively, may also consist of friction clutches. On the countershaft 18 a fifth cogwheel 92 is also arranged, which engages with a sixth cogwheel 94, which is arranged on the input shaft 95 of the range gearbox 11. The sixth cogwheel 94 may be arranged in such a manner that it may be connected with and disconnected from the input shaft 95 of the range gearbox 11.

The countershaft 18 is arranged between the respective first and second planetary gear 10, 12 and the output shaft 20. The countershaft 18 is connected with the input shaft 95 of the range gearbox 11 via a fifth gear pair 21, comprising the fifth and the sixth cogwheels 92, 94. The fifth cogwheel 92 is arranged in such a manner it may be connected with and disconnected from the countershaft 18 with the use of a fifth clutch element 93.

By disconnecting the fifth cogwheel 92, which is arranged to be disconnectable from the countershaft 18, it is possible to transfer torque from the second planetary gear 12 to the countershaft 18 via, for example, the second gear pair 66, and to further transfer torque from the countershaft 18 to the output shaft 20 via, for example, the first gear pair 60. Thus, a number of gear steps is obtained, wherein torque from one of the planetary gears 10, 12 may be transferred to the countershaft 18, and further along from the countershaft 18 to the main shaft 34, 36 connected with the second planetary gear 10, 12, in order to finally transfer torque to the output shaft 20 of the gearbox 2. This presumes, however, that a clutch mechanism 96, arranged between the first main shaft 34 and the range gearbox's 11 input shaft 95, is connected, which is described in more detail below.

The fifth cogwheel 92 may be locked to and released from the countershaft 18 with the assistance of a fifth clutch element 93. The clutch element 93 preferably consists of splines-equipped sections adapted on the fifth cogwheel 92 and the countershaft 18, which sections interact with a ninth clutch sleeve 87, which engages mechanically with the splines-equipped sections of the fifth cogwheel 92 and the countershaft 18. In the released state, a relative rotation may occur between the fifth cogwheel 92 and the countershaft 18. The fifth clutch element 93 may also consist of friction clutches.

Torque transfer from the input shaft 8 of the gearbox 2 to the output shaft 20 of the gearbox 2 may occur via the first or the second planetary gear 10 and 12, respectively, and the countershaft 18. The torque transfer may also occur directly via the first planetary gear 10, whose first sun wheel 26 is connected, via the first main shaft 34, to the input shaft 95 of the range gearbox 11 via a clutch mechanism 96. The clutch mechanism 96 preferably comprises a splines-equipped seventh clutch sleeve 100, which is axially shiftable on the first main shaft 34 and on the splines-equipped sections of the input shaft 95 of the range gearbox 11. By shifting the seventh clutch sleeve 100, in such a way that the splines-equipped sections are connected via the seventh clutch sleeve 100, the first main shaft 34 becomes locked with the input shaft 95 of the range gearbox 11, which, when rotating, will therefore have the same rotational speed. By disconnecting the fifth cogwheel 92 of the fifth gear pair 21 from the countershaft 18, torque from the second planetary gear 12 may be transferred to the countershaft 18, and further along from the countershaft 18 to the first main shaft 34, connected with the first planetary gear 10, in order to finally transfer torque via the clutch mechanism 96 to the output shaft 20 of the gearbox 2, via the range gearbox 11.

During operation, the gearbox 2 may in some operating modes operate in such a manner that one of the sun wheels 26 and 32, respectively, is locked with the first and the second planetary wheel carrier 50 and 51, respectively, with the help of the first and the second clutch device 56 and 58, respectively. The first and the second main shaft 34 and 36, respectively, then obtain the same rotational speed as the input shaft 8 of the gearbox 2, depending on which sun wheel 26 and 32, respectively, is locked with the respective planetary wheel carriers 50 and 51. One or both of the electrical machines 14 and 16, respectively, may operate as a generator to generate electric power to the energy storage device 46. Alternatively, the electrical machine 14 and 16, respectively, may provide a torque addition, in order to thus increase the torque in the output shaft 20. In some operating modes, the electrical machines 14 and 16, respectively, will supply each other with electric power, independently of the energy storage device 46.

In order to gear up the torque and thus increase the torque of the output shaft 20, the range gearbox 11 is arranged in the gearbox 2. The range gearbox 11 is preferably adapted as a planetary gear, but may also be adapted as one or several gear pairs. According to the embodiment shown in FIG. 2, the range gearbox 11 is adapted as a third planetary gear 110 with a third sun wheel 112, a third planetary wheel carrier 114 on which a third set of planetary wheels 116 is mounted, and a third ring gear 118. The third set of planetary wheels 116 interacts with the third ring gear 118 and the third sun wheel 112. The input shaft 95 of the range gearbox 11 is connected with the third sun wheel 112. The output shaft 20 is connected with the third planetary wheel carrier 114. A seventh cogwheel 120 may be locked and released on the countershaft 18 with the help of a seventh clutch element 122, which preferably consists of splines-equipped sections adapted on the seventh cogwheel 120 and the countershaft 18, which sections interact with the ninth clutch sleeve 87, which engages mechanically with the splines-equipped sections of the seventh cogwheel 120 and the countershaft 18. In the released state, a relative rotation may occur between the seventh cogwheel 120 and the countershaft 18. The seventh clutch element 122 may also consist of friction clutches. The seventh cogwheel 120 engages with an eight cogwheel 124, which is arranged on the third planetary wheel carrier 114, which eighth cogwheel may for example consist of a sprocket 124, arranged on the third planetary wheel carrier 114, entailing that rotational movement and torque may be transferred between the seventh cogwheel 120 and the third planetary wheel carrier 114. The seventh cogwheel 120 and the sprocket 124 on the third planetary wheel carrier 114 jointly form a seventh gear pair 125. When the seventh cogwheel 120 is locked on the countershaft 18 with the help of the ninth clutch sleeve 87 and the seventh clutch element 122, rotational movement and torque may thus be transferred between the countershaft 18 and the third planetary wheel carrier 114, and a high range position may be obtained.

The third internal ring gear 118 in the range gearbox 11 may be connected, in a low range position, with a gearbox house 126 arranged around the range gearbox 11, with the use of a third clutch device 128. A downshift of the rotational speed then takes place via the range gearbox 11, which entails a torque increase in the output shaft 20. The third sun wheel 112 may be connected with the third planetary wheel carrier 114 via a fourth clutch device 130, and thus achieve a high range position. The fourth clutch device 130 suitably comprises a splines-equipped clutch sleeve 132, which is axially shiftable on the third sun wheel 112 and the third planetary wheel carrier 114. The gearing through the range gearbox 11 is then 1:1.

It is also possible that both the first and the second electrical machine 14 and 16, respectively, generate power to the energy storage device 46. At engine braking the driver releases the accelerator pedal (not displayed) of the vehicle 1. The output shaft 20 of the gearbox 2 then operates one or both electrical machines 14 and 16, respectively, while the internal combustion engine 4 and the electrical machines 14 and 16, respectively, engine brake. In this case the electrical machines 14 and 16, respectively, generate electric power, which is stored in the energy storage device 46 in the vehicle 1. This operating state is referred to as regenerative braking. In order to facilitate a more powerful braking effect the output shaft 97 of the internal combustion engine 4 may be locked and thus be prevented from rotating. Thus, only one of or both the electrical machines 14 and 16, respectively, will function as a brake and generate electric power, which is stored in the energy storage device 46. The locking of the output shaft 97 of the internal combustion engine 4 may also be carried out when the vehicle has to be accelerated by only one or both the electrical machines 14 and 16. If the torque of one or both of the respective electrical machines 14 and 16 overcomes the torque off the internal combustion engine 4, and having regard to the gearing between them, the internal combustion engine 4 will not be able to resist the large torque generated by the respective electrical machines 14 and 16, so that it becomes necessary to lock the output shaft 97 of the internal combustion engine 4. The locking of the output shaft 97 of the internal combustion engine 4 is preferably carried out with a locking device 102, which is arranged between the first planetary wheel carrier 50 and the gear housing 42. By locking the first planetary wheel carrier 50 and the gear housing 42, the output shaft 97 of the internal combustion engine 4 will also be locked, since the output shaft 97 of the internal combustion engines 4 is connected with the first planetary wheel carrier 50 via the input shaft 8 of the gearbox. The locking device 102 preferably comprises a splines-equipped eighth clutch sleeve 104, which is axially shiftable on a splines-equipped section of the first planetary wheel carrier 50, and on a splines-equipped section of the gear housing. By shifting the eight clutch sleeve 104 in such manner that the splines-equipped sections are connected via the clutch sleeve 104, the first planetary wheel carrier 50, and therefore the output shaft 97 of the internal combustion engine 4, is prevented from rotating.

The control device 48 is connected to the electrical machines 14 and 16, respectively, in order to control the respective electrical machines 14 and 16, in such a way that they, during certain operating modes, use stored electric power to supply driving power to the output shaft 20 of the gearbox 2, and during other operating modes use the kinetic energy of the output shaft 20 of the gearbox 2 to extract and store electric power. The control device 48 thus detects the rotational speed and/or the torque of the output shaft 97 of the internal combustion engine 4 via sensors 98 arranged at the electrical machines 14 and 16, respectively, and in the output shaft 20 of the gearbox 2, in order thus to gather information and to control the electrical machines 14 and 16, respectively, to operate either as electrical motors or generators. The control device 48 may be a computer with software suitable for this purpose. The control device 48 also controls the flow of power between the energy storage device 46 and the respective stators 40 and 44 of the electrical machines 14 and 16, respectively. At such times when the electrical machines 14 and 16, respectively, operate as engines, stored electric power is supplied from the energy storage device 46 to the respective stators 40 and 44. At such times when the electrical machines 14 and 16 operate as generators, electric power is supplied from the respective stators 40 and 44 to the energy storage device 46. However, as stated above, the electrical machines 14 and 16, respectively, may, during certain operating modes, supply each other with electric power, independently of the energy storage device 46.

The first, the second, the third and the fourth clutch devices 56, 58, 128 and 130, respectively, the first, second, third, fourth, fifth and seventh clutch elements 84, 86, 88, 90, 93 and 122, respectively, the clutch mechanism 96 between the first main shaft 34 and the input shaft 95 of the range gearbox 11, and the locking device 102 between the first planetary wheel carrier 50 and the gear housing 42, are connected to the control device 48 via their respective clutch sleeves. These components are preferably activated and deactivated by electric signals from the control device 48. The clutch sleeves are preferably shifted by non-displayed power elements, such as hydraulically or pneumatically operated cylinders. It is also possible to shift the clutch sleeves with electrically powered power elements.

According to the embodiment in FIG. 2, four pinion gears 62, 68, 74 and 80, respectively, are shown and four cogwheels 64, 70, 76 and 82, respectively, as well as two respective planetary gears 10 and 12, with associated electrical machines 14 and 16. However, it is possible to adapt the gearbox 2 with more or fewer pinion gears and cogwheels, and with more planetary gears with associated electrical machines.

Figure 2B:
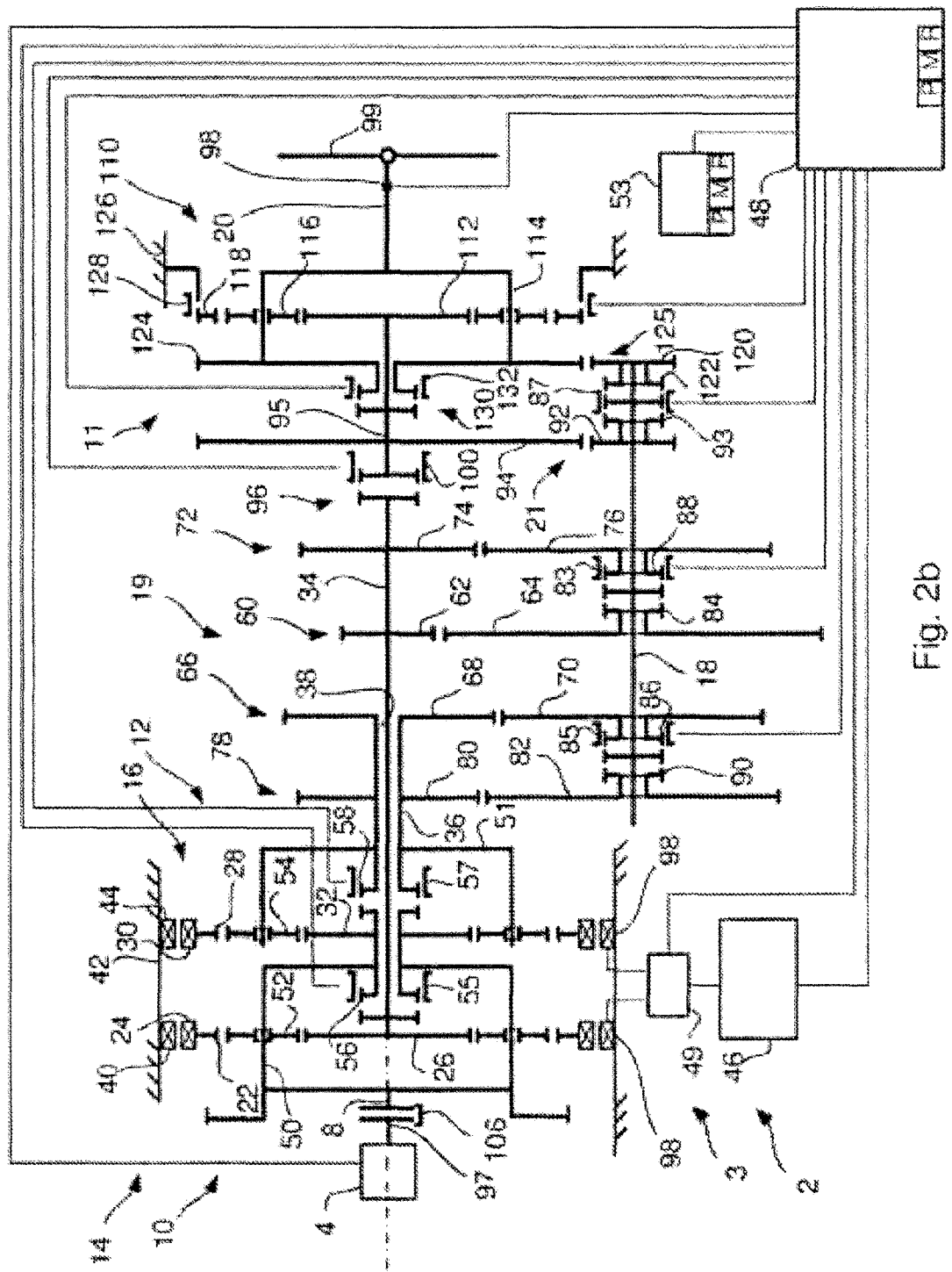

FIG. 2*b* shows a schematic side view of a hybrid powertrain 3 according to a second embodiment. The hybrid powertrain 3 is adapted as described in FIG. 2*a*, with the difference that the internal combustion engine 4 is connected with the gearbox 2 via a clutch device 106, arranged between the output shaft 97 of the internal combustion engine 4 and the input shaft 8 of the gearbox 2. The locking device 102, arranged between the first planetary wheel carrier 50 and the gearbox house 42, described in FIG. 2*a* has been omitted here. By opening the clutch device 106, the internal combustion engine 4 may be disconnected from the gearbox 2 and the vehicle 1 may thus be operated electrically via the first and the second electrical machine 14, 16. The clutch device 106 may consist of splines-equipped sections, which interact with a clutch sleeve. Alternatively, the clutch device 106 may consist of a friction clutch.

Below, an up-shift from a first to an eleventh gear will be described, wherein the gearbox 2 is arranged in a vehicle 1 and the vehicle is propelled by the internal combustion engine 4. The shift operation method described herein is applicable to a hybrid powertrain, configured as described in FIG. 2*a* or FIG. 2*b*.

The input shaft 8 of the gearbox 2 is connected to the output shaft 97 of the vehicle's 1 internal combustion engine 4. The output shaft 20 of the gearbox 2 is connected to a driving shaft 99 in the vehicle 1. At idling of the internal combustion engine 4 and when the vehicle 1 is at a standstill, the input shaft 8 of the gearbox 2 rotates at the same time as the output shaft 20 of the gearbox 2 is at a standstill. The locking device 102 is deactivated, so that the output shaft 97 of the internal combustion engine 4 may rotate freely. Since the input shaft 8 of the gearbox 2 rotates, the first planetary wheel carrier 50 will also rotate, which entails that the first set of planetary wheels 52 will rotate. Since the first planetary wheel carrier 50 is connected to the second sun wheel 32, the second sun wheel 32, and thus also the second set of planetary wheels 54, will rotate. By not supplying power to the first and the second electrical machines 14 and 16, respectively, the respective first and the second internal ring gears 22 and 28, which are connected with the respective first and second rotor 24 and 30 of the electrical machines 14 and 16, respectively, will rotate freely, so that no torque is absorbed by the respective internal ring gears 22 and 28. The first and the second clutch devices 56 and 58, respectively, are disconnected and thus not actuated. Thus, no torque will be transferred from the internal combustion engine 4 to the sun wheel 26 of the first planetary gear 10 or to the planetary wheel carrier 51 of the second planetary gear 12. The clutch mechanism 96 between the first main shaft 34 and the output shaft 20 is disconnected, so that the first main shaft 34 and the output shaft 20 may rotate freely in relation to each other. Since the first planetary gear's sun wheel 26, the planetary wheel carrier 51 of the second planetary gear 12 and the output shaft 20 of the gearbox 2 are, at this stage, at a standstill, the countershaft 18 is also at a standstill. In a first step the fourth cogwheel 82 and the third cogwheel 76 are connected with the countershaft 18 with the assistance of the fourth and third clutch elements 90 and 88, respectively. The first cogwheel 64 and the second cogwheel 70 are disconnected from the countershaft 18. Thus, the first cogwheel 64 and the second cogwheel 70 are allowed to rotate freely in relation to the countershaft 18. The fifth cogwheel 92 of the fifth gear pair 21 is locked on the countershaft 18 with the help of the fifth clutch element 93, so that the rotation and torque may be transferred to the range gearbox's 11 input shaft 95 via the sixth cogwheel 94. The seventh cogwheel 120, which engages with the sprocket 124 on the range gearbox's 11 third planetary wheel carrier 114, is disconnected from the countershaft 18 with the use of the seventh clutch element 122. The third ring gear 118 in the range gearbox 11 may be connected with the gearbox house 126 in a low range position, via a third clutch unit 128. The third ring gear 118 in the range gearbox 11 is connected with the gearbox house 126 via the third clutch unit 128, so that the range gearbox 11 is shifted to the low range position. The fourth clutch device 130 is disconnected, whereat the third sun wheel 112 and the third planetary wheel carrier 114 are disconnected from each other.

In order to start the rotation of the output shaft 20 of the gearbox 2, with the objective of driving the vehicle 1, the fourth pinion gear 80 and the fourth cogwheel 82 on the countershaft 18 must be brought to rotate. This is achieved by making the second planetary wheel carrier 51 rotate. When the second planetary wheel carrier 51 rotates, the second main shaft 36 will also rotate and thus the fourth pinion gear 80, which is arranged on the second main shaft 36, also rotates. The second planetary wheel carrier 51 is made to rotate by controlling the second internal ring gear 28 with the second electrical machine 16. By activating the second electrical machine 16 and controlling the internal combustion engine 4 towards a suitable engine speed, the vehicle 1 begins to move as the second main shaft 36 begins to rotate. When the second planetary wheel carrier 51 and the second sun wheel 32 achieve the same rotational speed, the second sun wheel 32 is locked with the second planetary wheel carrier 51 with the assistance of the second clutch device 58. As mentioned above, the second clutch device 58 is preferably adapted in such a way that the second sun wheel 32 and the second planetary wheel carrier 51 engage mechanically with each other. Alternatively, the second clutch device 58 may be adapted as a slip brake or a multi-plate clutch which connects, in a smooth way, the second sun wheel 32 with the second planetary wheel carrier 51. When the second sun wheel 32 is connected with the second planetary wheel carrier 51, the second planetary wheel carrier 51 will rotate with the same rotational speed as the output shaft 97 of the internal combustion engine 4. Thus, the torque generated by the internal combustion engine 4 is transferred to the output shaft 20 of the gearbox 2 via the fourth pinion gear 80, the fourth cogwheel 82 on the countershaft 18, the fifth cogwheel 92 on the countershaft 18, and the sixth cogwheel 94 on the input shaft 95 of the range gearbox 11. A downshift of the rotational speed takes place via the range gearbox 11, which is shifted to the low range gearbox. Finally, the propulsion torque is transferred to the output shaft 20 of the gearbox 2 via the third planetary wheel carrier 114 of the range gearbox 11. The vehicle 1 will thus begin to move off and be propelled by a first gear.

Each of the first, second, third and fourth gear pairs 60, 66, 72, 78 has a gearing, which is adapted to desired driving characteristics of the vehicle 1. According to the example embodiment displayed in FIG. 2, the fourth gear pair 78 has the highest gearing compared to the first, second and third gear pairs 60, 66, 72, which results in the fourth gear pair 78 being connected when the lowest gear is engaged. The second gear pair 66 transfers, as does the fourth gear pair 78, torque between the second main shaft 36 and the countershaft 18, and could instead be fitted out with the highest gearing, compared with the other gear pairs 60, 72, 78, which is why in such an embodiment the second gear pair 66 could be connected when the lowest gear is engaged.

When the countershaft 18 is made to rotate by the fourth cogwheel 82 on the countershaft 18, the third cogwheel 76 on the countershaft 18 will also rotate. Thus, the countershaft 18 operates the third cogwheel 76, which in turn operates the third pinion gear 74 on the first main shaft 34. When the first main shaft 34 rotates, the first sun wheel 26 will also rotate, and, depending on the rotational speed of the output shaft 97 of the internal combustion engine 4 and thus on the rotational speed of the first planetary wheel carrier 50, it will cause the first internal ring gear 22 and the first rotor 24 of the first electrical machine 14 to rotate. In this case it is possible to allow the first electrical machine 14 to operate as a generator, in order to supply power to the energy storage device 46, and/or to supply power to the second electrical machine 16. It is also possible for the second electrical machine 16 to be operated as a generator. Alternatively, the first electrical machine 14 may emit a torque addition, by way of the control device 48 controlling the first electrical machine 14 to provide a driving torque.

In order to shift gears from the first to the second gear, the locking between the second sun wheel 32 and the second planetary wheel carrier 51 must cease, which is achieved by way of the first and/or the second electrical machine 14, 16 being controlled in such a way that torque balance prevails in the second planetary gear 12. Subsequently, the second clutch device 58 is controlled in such a manner that it disconnects the second sun wheel 32 and the second planetary wheel carrier 51 from each other. The second planetary wheel carrier 51 and also the second main shaft 36 may rotate freely, which entails that the second sun wheel 32, the second planetary wheel carrier 51 and the second main shaft 36 no longer operate the fourth pinion gear 80, arranged on the second main shaft 36. This assumes that the second electrical machine 16 does not operate the second ring gear 28. The second gear is connected, by way of the control device 48 controlling the internal combustion engine 4, in such a way that a synchronous rotational speed arises between the first planetary wheel carrier 50 and the first sun wheel 26, in order to achieve a locking between the first planetary wheel carrier 50 and the first sun wheel 26. This is achieved by way of controlling the first clutch device 56 in such a way that the first planetary wheel carrier 50 and the first sun wheel 26 are mechanically connected with each other. Alternatively, the first clutch device 56 may be adapted as a slip brake or a multi-plate clutch which connects, in a smooth way, the first sun wheel 26 with the first planetary wheel carrier 50. By synchronising the control of the internal combustion engine 4 and the second and first electrical machine 16 and 14, respectively, a soft and disruption-free transition from a first to a second gear may be carried out.

The first main shaft 34 now rotates, operated by the output shaft 97 of the internal combustion engine 4, and the first main shaft 34 now operates the third pinion gear 74. The first planetary wheel carrier 50 thus operates the third pinion gear 74 via the first sun wheel 26 and the first main shaft 34. Since the third cogwheel 76 is in engagement with the third pinion gear 74 and is connected with the countershaft 18, the third cogwheel 76 will operate the countershaft 18, which in turn operates the fifth cogwheel 92 on the countershaft 18. The fifth cogwheel 92 in turn operates the output shaft 20 of the gearbox 2, via the sixth cogwheel 94, which is arranged on the input shaft 95 of the range gearbox 11, and via the range gearbox 11. The vehicle 1 is now operated with a second gear.

When the countershaft 18 is made to rotate by the third cogwheel 76, the fourth cogwheel 82 will also rotate. Thus, the countershaft 18 operates the fourth cogwheel 82, which in turn operates the fourth pinion gear 80 on the second main shaft 36. When the second main shaft 36 rotates, the second planetary wheel carrier 51 will also rotate, and, depending on the rotational speed of the output shaft 97 of the internal combustion engine 4, and thus on the rotational speed in the first planetary wheel carrier 50, it will cause the second internal ring gear 28 and the second rotor 30 of the second electrical machine 16 to rotate. It is thus possible to allow the second electrical machine 16 to operate as a generator, in order to supply power to the energy storage device 46, and/or to supply power to the first electrical machine 14. The second electrical machine 16 may also emit a torque addition, by way of the control device 48 controlling the second electrical machine 16 towards providing a propulsion torque.

In order to shift from a second gear to a third gear, the fourth cogwheel 82 on the countershaft 18 must be disconnected from the countershaft 18 with the fourth clutch element 90, so that the fourth cogwheel 82 may rotate freely in relation to the countershaft 18. Subsequently, the countershaft 18 is connected with the second cogwheel 70 on the countershaft 18 via the second clutch element 86. In order to achieve a connection of the countershaft 18 and the second cogwheel 70 on the countershaft 18, preferably the second electrical machine 16 is controlled in such a way that a synchronous rotational speed arises between the countershaft 18 and the second cogwheel 70 on the countershaft 18. A synchronous rotational speed may be determined by way of measuring the rotational speed of the second rotor 30 in the second electrical machine 16, and by measuring the rotational speed of the output shaft 20. Thus, the rotational speed in the second main shaft 36 and the rotational speed in the countershaft 18 may be determined by way of given gear ratios. The rotational speed of the respective shafts 18, 36 is controlled, and when a synchronous rotational speed has arisen between the countershaft 18 and the second cogwheel 70, the countershaft 18 and the second cogwheel 70 are connected with the assistance of the second clutch element 86.

In order to complete the shift from a second gear to a third gear, the locking between the first sun wheel 26 and the first planetary wheel carrier 50 must cease, which is achieved by way of the first and/or the second electrical machine 16 being controlled, in such a way that torque balance is achieved in the first planetary gear 10, following which the first clutch device 56 is controlled in such a manner that it releases the first sun wheel 26 and the first planetary wheel carrier 50 from each other. Subsequently, the internal combustion engine 4 is controlled in such a way that a synchronous rotational speed arises between the second sun wheel 32 and the second planetary wheel carrier 51, so that the second clutch device 58 may be engaged in order thus to connect the second sun wheel 32 with the second planetary wheel carrier 51, via the clutch sleeve 57. By synchronising the control of the internal combustion engine 4 and the second and first electrical machine 14 and 16, respectively, a soft and disruption-free transition from a second to a third gear may be carried out.

The third cogwheel 76 is disconnected by controlling the first electrical machine 14 in such a way that a substantially zero torque state arises between the countershaft 18 and the third cogwheel 76. When a substantially zero torque state arises, the third cogwheel 76 is disconnected from the countershaft 18 by controlling the third clutch element 88 in such a way that it releases the third cogwheel 76 from the countershaft 18. Subsequently, the first electrical machine 14 is controlled in such a way that a synchronous rotational speed arises between the countershaft 18 and the first cogwheel 64. When a synchronous rotational speed arises, the first cogwheel 64 is connected to the countershaft 18 by way of controlling the first clutch element 84 in such a manner so that it connects the first cogwheel 64 on the countershaft 18. A synchronous rotational speed may be determined, since the rotational speed of the first rotor 24 in the first electrical machine 14 is measured and the rotational speed of the output shaft 20 is measured, following which the rotational speeds of the shafts 18, 34 are controlled in such a way that a synchronous rotational speed arises. Thus, the rotational speed of the first main shaft 34 and the rotational speed of the countershaft 18 may be determined by way of given gear ratios.

The second main shaft 36 now rotates with the same rotational speed as the output shaft 97 of the internal combustion engine 4, and the second main shaft 36 now operates the second pinion gear 68 via the second main shaft 36. Since the second cogwheel 70 is in engagement with the second pinion gear 68 and is connected with the countershaft 18, the second cogwheel 70 will operate the countershaft 18, which in turn operates the fifth cogwheel 92 on the countershaft 18. The fifth cogwheel 92 in turn operates the output shaft 20 of the gearbox 2, via the sixth cogwheel 94, which is arranged on the input shaft 95 of the range gearbox 11, and via the range gearbox 11. The vehicle 1 is now driven in a third gear.

When the countershaft 18 is made to rotate by the second cogwheel 70 on the countershaft 18, the first cogwheel 64 on the countershaft 18 will also rotate. Thus, the countershaft 18 operates the first cogwheel 64, which in turn operates the first pinion gear 62 on the first main shaft 34. When the first main shaft 34 rotates, the first sun wheel 26 will also rotate, and, depending on the rotational speed of the output shaft 97 of the internal combustion engine 4, and thus on the rotational speed of the first planetary wheel carrier 50, it will cause the first internal ring gear 22 and the first rotor 24 of the second electrical machine 16 to rotate. It is thus possible to allow the first electrical machine 14 operate as a generator, in order to supply power to the energy storage device 46, and/or to supply power to the second electrical machine 16. Alternatively, the first electrical machine 14 may emit a torque addition, by way of the control device 48 controlling the first electrical machine 14 towards providing a driving torque.

In order to complete the shift from the third to the fourth gear, the locking between the second sun wheel 32 and the second planetary wheel carrier 51 must cease, which is achieved by way of controlling the first electrical machine 14 in such a way that torque balance arises in the second planetary gear 12, following which the second clutch device 58 is controlled in such a way that it releases the second sun wheel 32 and the second planetary wheel carrier 51 from each other. A fourth gear is subsequently connected by way of the control device 48 controlling the internal combustion engine 4 in such a manner that a synchronous rotational speed arises between the first planetary wheel carrier 50 and the first sun wheel 26, in order to achieve a locking between the first planetary wheel carrier 50 and the first sun wheel 26. This is achieved by way of controlling the first clutch device 56 in such a way that the first planetary wheel carrier 50 and the first sun wheel 26 are mechanically connected with each other. By synchronising the control of the internal combustion engine 4 and the second and first electrical machine 14 and 16 a soft and disruption-free transition from a third to a fourth gear may be carried out.

The first main shaft 34 now rotates and is operated by the output shaft 97 of the internal combustion engine 4 and the first main shaft 34 now operates the first pinion gear 62. The first planetary wheel carrier 50 thus operates the first pinion gear 62 via the first sun wheel 26 and the first main shaft 34. Since the first cogwheel 64 is in engagement with the first pinion gear 62 and is connected with the countershaft 18, the first cogwheel 64 will operate the countershaft 18, which in turn operates the fifth cogwheel 92 on the countershaft 18. The fifth cogwheel 92 in turn operates the output shaft 20 of the gearbox 2, via the sixth cogwheel 94, which is arranged on the input shaft 95 of the range gearbox 11, and via the range gearbox 11. The vehicle 1 is now driven in a fourth gear.

When the countershaft 18 is made to rotate by the first cogwheel 64, the second cogwheel 70 will also rotate. Thus, the countershaft 18 operates the second cogwheel 70, which in turn operates the second pinion gear 68 on the second main shaft 36. When the second main shaft 36 rotates, the second planetary wheel carrier 51 will also rotate, and, depending on the rotational speed of the output shaft 97 of the internal combustion engine 4, and thus on the rotational speed in the first planetary wheel carrier 50, it will cause the second internal ring gear 28 and the second rotor 30 of the second electrical machine 16 to rotate. It is thus possible to allow the second electrical machine 16 to operate as a generator, in order to supply power to the energy storage device 46, and/or to supply power to the first electrical machine 14. The second electrical machine 16 may also emit a torque addition, by way of the control device 48 controlling the second electrical machine 16 towards providing a propulsion torque.

In order to shift gears from a fourth gear to a fifth gear, the first cogwheel 64 must be disengaged from the countershaft 18, so that the fourth gear is disengaged. This is achieved by way of controlling the internal combustion engine 4 and the first electrical machine 14, in such a way that the first cogwheel 64 is brought to a substantially zero torque state in relation to the countershaft 18. When a substantially zero torque state has arisen, the first clutch element 84 is disengaged, so that the first cogwheel 64 is disconnected from the countershaft 18.

Subsequently, the rotational speed of the first main shaft 34 is synchronized with the rotational speed of the output shaft 20, following which the clutch mechanism 96 is controlled in such a way that it connects the first main shaft 34 with the input shaft 95 of the range gearbox 11.

Subsequently, the internal combustion engine 4 and the first electrical machine 14 are controlled in such a way that the propulsion torque occurs via the first main shaft 34 and via the clutch mechanism 96 to the input shaft 95 of the range gearbox 11, through the range gearbox 11 and further along to the output shaft 20. By reducing the torque from the second electrical machine 16, the fifth clutch element 93 may be brought to a substantially zero torque state in relation to the countershaft 18. When a substantially zero torque state has arisen, the fifth clutch element 93 is disengaged, so that the fifth cogwheel 92 of the fifth gear pair 21 is disconnected from the countershaft 18.

Subsequently, with the help of the second electrical machine 16, the rotational speed of the countershaft 18 is synchronized with the rotational speed of the third cogwheel 76, following which the third clutch element 88 is controlled in such a way that it connects the third cogwheel 76 with the countershaft 18. When this connection has been completed, the propulsion torque may be shared between the internal combustion engine 4, the first electrical machine 14 and the second electrical machine 16. Subsequently, torque balance is created in the first planetary gear 10, following which the first clutch device 56 disconnects the first planetary wheel carrier 50 and the first sun wheel 26 from each other. Finally, the rotational speed of the second planetary wheel carrier 51 is synchronized with the second sun wheel 32, following which the second clutch device 58 connects the second planetary wheel carrier 51 and the second sun wheel 32 with each other.

The second main shaft 36 now rotates, operated by the output shaft 97 of the internal combustion engine 4, and the second main shaft 36 operates the second pinion gear 68. Since the second cogwheel 70 is in engagement with the second pinion gear 68 and is connected with the countershaft 18 via the second clutch element 86, the second cogwheel 70 will operate the countershaft 18, which in turn operates the third cogwheel 76 on the countershaft 18. The third cogwheel 76 in turn operates the first main shaft 34 via the third pinion gear 74, and the output shaft 20 of the gearbox 2 is thus operated via the clutch mechanism 96, which connects the first main shaft 34 with the input shaft 95 of the range gearbox 11. The vehicle 1 is now driven in a fifth gear.

In order to shift gears from the fifth to the sixth gear, the locking between the second sun wheel 32 and the second planetary wheel carrier 51 must cease, which is achieved by way of the first electrical machine 14 and the combustion engine 4 being controlled in such a way that torque balance is achieved in the second planetary gear 12, following which the second clutch device 58 is controlled in such a way that it releases the second sun wheel 32 and the second planetary wheel carrier 51 from each other. A sixth gear is subsequently connected, by way of the control device 48 controlling the internal combustion engine 4, in such a way that a synchronous rotational speed arises between the first planetary wheel carrier 50 and the first sun wheel 26, in order to achieve a locking between the first planetary wheel carrier 50 and the first sun wheel 26. This is achieved by way of controlling the first clutch device 56 in such a way that the first planetary wheel carrier 50 and the first sun wheel 26 are mechanically connected with each other. By synchronizing the control of the internal combustion engine 4 and the second and first electrical machine 14 and 16, respectively, a soft and disruption-free transition from a fifth to a sixth gear may be carried out.

The first main shaft 34 now rotates operated by the output shaft 97 of the internal combustion engine 4, whereat the first main shaft 34 operates the output shaft 20 of the gearbox 2 via the clutch mechanism 96, which connects the first main shaft 34 with the input shaft 95 of the range gearbox 11. The vehicle 1 is now driven in a sixth gear.

In order to shift from a sixth to a seventh gear, the third cogwheel 76 on the countershaft 18 must first be disconnected from the countershaft 18 with the third clutch element 88, so that the third cogwheel 76 may rotate freely in relation to the countershaft 18. Subsequently the second cogwheel 70 is disconnected from the countershaft 18 with the use of the second clutch element 86, and the fourth cogwheel 82 is connected on the countershaft 18 via the fourth clutch element 90. When the countershaft 18 and the fourth cogwheel 82 on the countershaft 18 have a synchronous rotational speed, the fourth clutch element 90 is controlled in such a way that the fourth cogwheel 82 and the countershaft 18 are connected.

In order to complete the shift operation from the sixth gear to the seventh gear, the sixth gear pair 125 is connected to the countershaft 18, so that the countershaft 18 becomes directly connected with the range gearbox 11. In order to achieve this, the second electrical machine 16 is controlled in such a manner that a synchronous rotational speed arises between the countershaft 18 and the seventh cogwheel 120, mounted on the countershaft 18. When a synchronous rotational speed has been obtained, the countershaft 18 and the seventh cogwheel 120 are connected via the seventh clutch element 122 and the ninth clutch sleeve 87. The propulsion torque may now be transferred from the first to the second electrical machine 14, 16 and further along to the output shaft 20, via the fourth cogwheel 82 and the seventh cogwheel 120 on the countershaft 18, and via the range gearbox 11. The second electrical machine 16 may, during these steps, be controlled by electric power generated by the first electrical machine 14. Since the rotatable components 22, 26, 50 in the first planetary gear 10 are connected, the first electrical machine 14 may be controlled to impact the internal combustion engine 4 with a negative torque. The internal combustion engine 4 is then in turn controlled in such a manner that it increases its torque so that it corresponds to the negative torque, and thus the first electrical machine 14 may produce energy, which may operate the second electrical machine 16.

Subsequently, the third clutch device 128 is moved from the connected state between the third ring gear 118 and the gearbox house 126 to a neutral position, which entails that the third ring gear 118 is disconnected from the gearbox house 126. The third ring gear 118 in the range gearbox 11 may therefore rotate freely. Accordingly, no torque transmission takes place through the range gearbox 11. Since the fourth clutch device 130 is controlled in such a manner that the third sun wheel 112 and the third planetary wheel carrier 114 are disconnected from each other, and since the sixth gear pair 125 is connected to the countershaft, the range gearbox 11 is thus shifted to a high range position, in which the gear ratio through the range gearbox 11 is 1:1. The gear ratio from the countershaft 18 to the output shaft 20 may thus be 1:1. Accordingly, a shift from the low range position to the high range position has been achieved without any torque interruption and without the use of an energy storage device.

Subsequently, the internal combustion engine 4 is controlled in such a way that a synchronous rotational speed arises between the second sun wheel 32 and the second planetary wheel carrier 51, so that the second clutch device 58 may be engaged in order thus to connect the second sun wheel 32 with the second planetary wheel carrier 51, via the clutch sleeve 57. The vehicle 1 is now driven in a seventh gear.

In connection with a shift operation from a seventh to an eighth gear, preferably the hybrid powertrain 3 is prepared for future high range gears by first disconnecting the first sun wheel 26 and the first planetary wheel carrier 50 from each other. This is achieved by way of controlling the first electrical machine 14 in such a way that no torque is transferred in the first planetary gear 10, following which the first clutch device 56 is controlled in such a manner that it disconnects the first sun wheel 26 and the first planetary wheel carrier 50 from each other. Subsequently, the first electrical machine 14 is controlled in such a manner that the third sun wheel 112 in the range gearbox 11 is controlled towards a rotational speed, which is synchronous with the output shaft 20. When a synchronous rotational speed has been obtained, the fourth clutch device 130 may be shifted, so that the third sun wheel 112 and the third planetary wheel carrier 114 are connected. Furthermore, the clutch mechanism 96 is controlled in such a way that the first main shaft 34 and the input shaft 95 to the range gearbox 11 are disconnected from each other.

In order to achieve an eighth gear, the first electrical machine 14 is subsequently controlled in such a way that a synchronous rotational speed is achieved between the third cogwheel 76 and the countershaft 18, following which the third cogwheel 76 is connected to the countershaft 18 with the use of the third clutch element 88. Subsequently, the locking between the second sun wheel 32 and the second planetary wheel carrier 51 must cease, which is achieved by way of the first and/or the second electrical machine 14, 16 being controlled in such a way that torque balance is achieved in the second planetary gear 12. Subsequently, the second clutch device 58 is controlled in such a manner that it disconnects the second sun wheel 32 and the second planetary wheel carrier 51 from each other. Furthermore, the internal combustion engine 4 is controlled in such a manner that a synchronous rotational speed arises between the first planetary wheel carrier 50 and the first sun wheel 26, in order to achieve a locking between the first planetary wheel carrier 50 and the first sun wheel 26. This is achieved by way of controlling the first clutch device 56 in such a way that the first planetary wheel carrier 50 and the first sun wheel 26 are mechanically connected with each other. In this manner, an eighth gear is achieved in a high range position.

The steps to shift from an eighth gear to a ninth gear correspond to the steps which are carried out to shift from a second gear to a third gear, with the difference that the sixth gear pair 125 is connected to the countershaft 18, and that the third sun wheel 112 in the range gearbox 11 is connected with the third planetary wheel carrier 114. The third ring gear 118 in the range gearbox 11 is no longer connected with the gearbox house 126, via the third clutch device 128, and the fifth cogwheel 92 in the fifth gear pair 21 is disconnected from the countershaft 18.

The steps of shifting from a ninth gear to a tenth gear correspond to the steps of shifting from a third to a fourth gear, with the difference that the sixth gear pair 125 is connected to the countershaft 18, that the third sun wheel 112 in the range gearbox 11 is connected with the third planetary wheel carrier 114, and that the third ring gear 118 in the range gearbox 11 is no longer connected with the gearbox house 126 with the use of the third clutch device 128, and that the fifth cogwheel 92 in the fifth gear pair 21 is disconnected from the countershaft 18.

The steps of shifting from a tenth to an eleventh gear correspond to the steps of shifting from a fourth to a fifth gear, with the addition that the sixth gear pair 125 is disconnected from the countershaft 18 with the use of the seventh clutch element 122 and the ninth clutch sleeve 87. Furthermore, the clutch mechanism 96 is controlled in such a manner that the first main shaft 34 and the input shaft 95 to the range gearbox 11 are connected. Torque transmission then occurs from the input shaft 95 of the range gearbox 11 to the output shaft 20, via the fourth clutch device 130 and the third planetary wheel carrier 114.

Subsequently, additional gears are achieved in the high range position in a similar manner as in the low range position, without any torque interruption and without the use of an energy storage device.

Alternatively, the hybrid powertrain 3 is not prepared for future high range gears by way of connecting the third sun wheel 112 and the third planetary wheel carrier 114 at the transition between the seventh and the eighth gear, but instead at the transition between a tenth gear and an eleventh gear. The clutch mechanism 96 in this case connects the first main shaft 34 and the input shaft 95 to the range gearbox 11 during all gear steps in the high range position.

In this alternative, shifts are made from a seventh to an eighth gear, from an eighth to a ninth gear and from a ninth to a tenth gear in a different manner than in the case where the third sun wheel 112 and the third planetary wheel carrier 114 are connected. In this case, the seventh gear and the ninth gear comprise that the rotatable components 32, 51 of the second planetary gear 12 are connected, and that the first cogwheel 64 and the third cogwheel 76 are disconnected from the countershaft 18. The gear pairs 60, 72, connected with the first planetary gearbox 10 and the output shaft 20, are thus in a neutral state. The eighth gear and the tenth gear comprise that the rotatable components 32, 51 of the second planetary gear 12 are disconnected from each other, and that the first cogwheel 64 or the third cogwheel 76 is connected to the countershaft 18. The rotatable components 26, 50 of the first planetary gear 10 are connected all the time during this alternative shift operation, the fifth cogwheel 92 of the fifth gear pair 21 is disconnected from the countershaft 18, and the clutch mechanism 96 connects the first main shaft 34 and the input shaft 95 to the range gearbox 11. Furthermore, the sixth gear pair 125 is connected to the countershaft 18. In order to shift from one gear to another, one must therefore always pass a state where the rotatable components 32, 51 of the second planetary gear 12 are disconnected, and where the first cogwheel 64 and the third cogwheel 76 are disconnected from the countershaft 18. In this state, the torque in the output shaft 20 is achieved with the second electrical machine 16, via the second planetary gearbox 12 and the sixth gear pair 125. At the same time, the first electrical machine 14 may generate electric power to the second electrical machine 16 by being controlled in such a way that it impacts the internal combustion engine 4 with a negative torque. The internal combustion engine 4 is then in turn controlled in such a manner that it increases its torque, corresponding to the negative torque.

For example, a shift from the seventh gear to the eighth gear is in this case achieved by way of disconnecting the second sun wheel 32 and the second planetary wheel carrier 51. This is achieved by way of controlling the first and/or the second electrical machine 14, 16 in such a way that torque balance is achieved in the second planetary gear 12. Subsequently, the second clutch device 58 is controlled in such a manner that it disconnects the second sun wheel 32 and the second planetary wheel carrier 51 from each other. Furthermore, the internal combustion engine 4 is controlled in such a manner that a synchronous rotational speed is achieved between the third cogwheel 76 and the countershaft 18, following which the third cogwheel 76 is connected to the countershaft 18 with the use of the third clutch element 88.

Shifting from a tenth to an eleventh gear in this case corresponds to the steps of shifting from a fourth to a fifth gear, with the addition that the first sun wheel 26 and the first planetary wheel carrier 50 are disconnected from each other. Subsequently, the first electrical machine 14 is controlled in such a way that the third sun wheel 112 in the range gearbox 11 is controlled towards a rotational speed, which is synchronous with the output shaft 20. When a synchronous rotational speed has been obtained, the fourth clutch device 130 may be shifted, so that the third sun wheel 112 and the third planetary wheel carrier 114 are connected. Furthermore, the sixth gear pair 125 is disconnected from the countershaft 18 with the use of the seventh clutch element 122 and the ninth clutch sleeve 87. Subsequently, the internal combustion engine is controlled in such a manner that a synchronous rotational speed is achieved between two rotatable components 28, 32, 51 in the second planetary gear 12. In this manner, the two rotatable components 28, 32, 51 may easily be connected via a second clutch device 58.

It is possible to realise a number of additional gear steps when the range gearbox 11 is shifted to the high range state. Preferably, the gear ratio between the seventh cog wheel 120 and the sprocket 124 on the planetary wheel carrier of the range gearbox 11 is equal to the gear ratio between the fifth and the sixth cogwheel. Accordingly, substantially equal steps are obtained between the gears in the gearbox, regardless of whether the range gearbox 11 is in the low range position or the high range position.

In order to carry out a shift operation in the opposite direction, that is to say from a high range position to a low range position, the gear steps above are carried out substantially in the opposite order.

According to the embodiment above, the gearbox 2 comprises pinion gears 62, 68, 74, 80 and cogwheels 64, 70, 76, 82 arranged on the main shafts 34, 36 and the countershaft 18, respectively, to transfer rotational speed and torque.

However, it is possible to use another type of transmission, such as chain and belt drives, to transfer rotational speed and torque in the gearbox 2.

The transmission device 19 has four gear pairs 60, 66, 72, 78 according to the example embodiment. However, the transmission device 19 may comprise any number of gear pairs.

Figure 3:
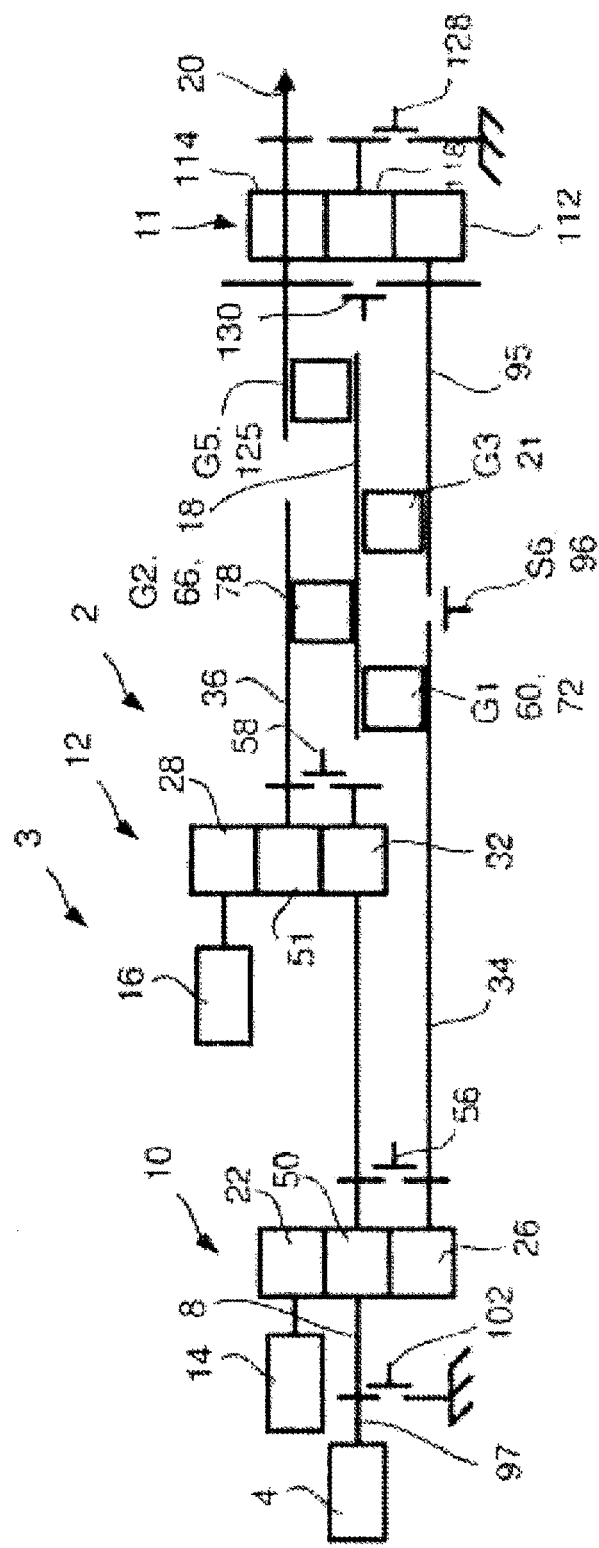
FIG. 3 shows a simplified schematic view of the hybrid powertrain in FIG. 2a, and FIG. 4a-b shows flow charts of methods to control a hybrid powertrain according to the present invention.

FIG. 3 illustrates the hybrid powertrain 3 according to FIG. 2a in a simplified view, where some components have been excluded in the interest of clarity. G1 in FIG. 3 consists of at least one gear pair connected with the first main shaft 34, and therefore with the first planetary gear 10, and G2 consists of at least one gear pair connected with the second main shaft 36, and therefore with the second planetary gear 12. These gear pairs G1, G2 are also connected to the output shaft 20 via the countershaft 18. G1 and G2, respectively, may consist of one or several gear pairs. The gear pair G1, connected with the first planetary gear 10, may for example consist of the first gear pair 60 and/or the third gear pair 72, as described in FIG. 2a. The gear pair G2, connected with the second planetary gear 12, may for example consist of the second gear pair 66 and/or the fourth gear pair 78, as described in FIG. 2a. Further, at least one gear pair G3, connected with the input shaft 95 and the countershaft 18 of the range gearbox 11 is displayed, which may consist of the fifth gear pair 21 described in FIG. 2. G3 may consist of one or several gear pairs. G5 relates to the sixth gear pair 125 formed by the seventh cogwheel 120 on the countershaft and the sprocket 124 on the third planetary wheel carrier 114 of the range gearbox 11. Furthermore, the fourth clutch device 130 is displayed, which is arranged to facilitate that the third sun wheel 112 and the third planetary wheel carrier 114 may be connected in a high range position.

Figure 4A:
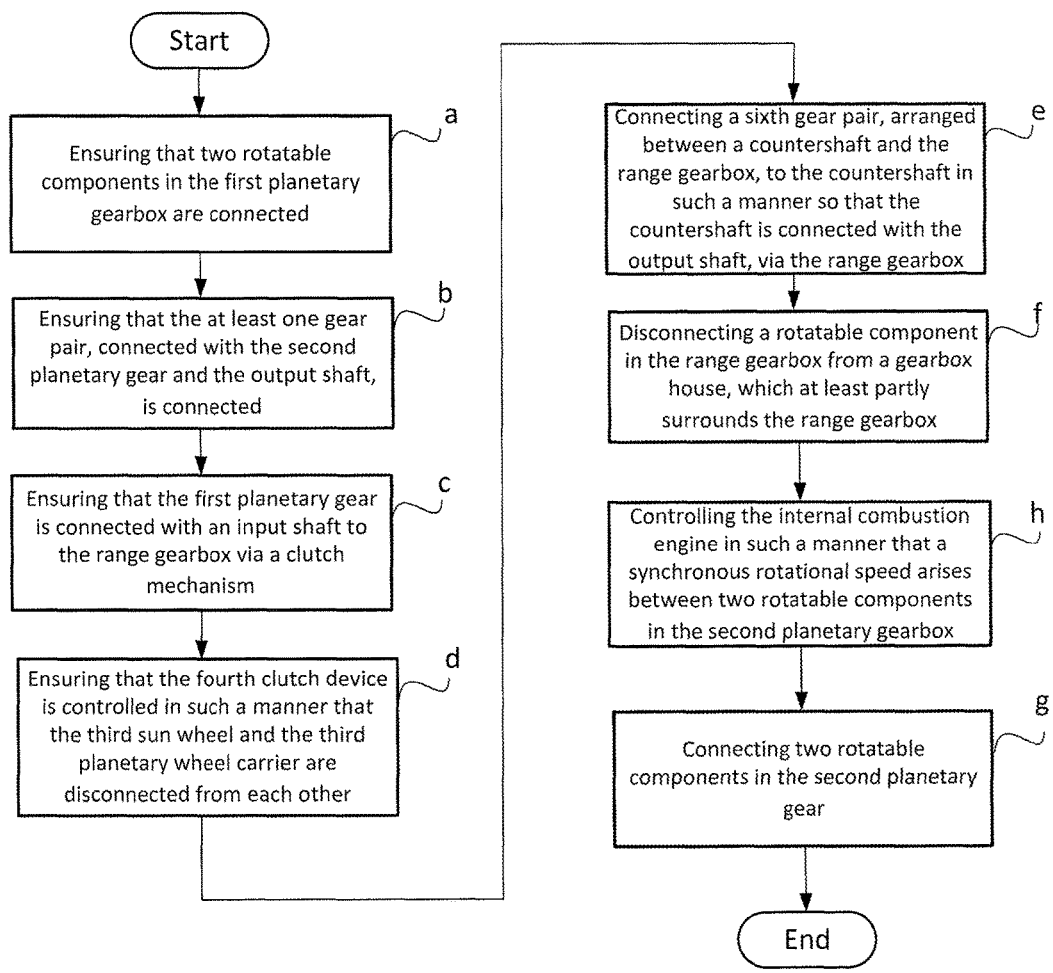

FIG. 4a shows a flow chart relating to a method to control a hybrid powertrain 3, in order to achieve a shift operation to a high range position without torque interruption, wherein the hybrid powertrain 3 comprises an internal combustion engine 4; a gearbox 2 with an input shaft 8 and an output shaft 20; a range gearbox 11 connected to the output shaft 20; a first planetary gear 10, connected to the input shaft 8; a second planetary gear 12, connected to the first planetary gear 10; a first electrical machine 14, connected to the first planetary gear 10; a second electrical machine 16, connected to the second planetary gear 12; at least one gear pair 60, 72, connected with the first planetary gear 10 and the output shaft 20; and at least one gear pair 66, 78, connected with the second planetary gear 12 and the output shaft 20, wherein the internal combustion engine 4 is connected with the first planetary gear 10 via the input shaft 8, and wherein the range gearbox 11 comprises a third planetary gear 110 with a third sun wheel 112 and a third planetary wheel carrier 114, and wherein a fourth clutch device 130 is arranged to connect and disconnect the third sun wheel 112 with/from the third planetary wheel carrier 114. The method comprises the steps:

a) ensuring that two rotatable components 22, 26, 50 in the first planetary gear 10 are connected;

b) ensuring that the at least one gear pair 66; 78, connected with the second planetary gear 12 and the output shaft 20, is connected;

c) ensuring that the first planetary gear 10 is connected with an input shaft 95 of the range gearbox 11, via a clutch mechanism 96;

d) ensuring that the fourth clutch device 130 is controlled in such a manner that the third sun wheel 112 and the third planetary wheel carrier 114 are disconnected from each other;

e) connecting a sixth gear pair 125, arranged between a countershaft 18 and the range gearbox 11, with the countershaft 18, so that the countershaft 18 is connected with the output shaft 20 via the range gearbox 11;

f) disconnecting a rotatable component 118 in the range gearbox 11 from a gearbox house 126 at least partly surrounding the range gearbox 11; and g) connecting two rotatable components 28, 32, 51 in the second planetary gearbox 12.

In this manner, control of the hybrid powertrain 3 is achieved, so that a gear step to a high range position is obtained without torque interruption. The high range position is thus achieved without synchronization of the range gearbox 11 being necessary at this stage, by way of connecting the sixth gear pair 125 and by ensuring that the third sun wheel 112 and the third planetary wheel carrier 114 are disconnected from each other.

The range gearbox suitably comprises a third planetary gear 110 with a third sun wheel 112, a third planetary wheel carrier 114 and a third ring gear 118.

The method suitably comprises the additional step, after step f) and before step g):

h) controlling the internal combustion engine 4 in such a manner that a synchronous rotational speed arises between two rotatable components 28, 32, 51 in the second planetary gear 12. In this manner, the two rotatable components 28, 32, 51 may easily be connected via a second clutch device 58 in step g).

Suitably, the method is initiated when driving with a gear in a low range position. Thus, a rotatable component 118 in a range gearbox 11 is prevented from rotating. The third ring gear 118, arranged in the third planetary gear, is suitably connected with a gearbox house 126 and is thus prevented from rotating. This ensures that the range gearbox is in a low range position. Performing the method steps a)-c) ensures that propulsion is via a gear in a low range position, from which shifting to a high range position is possible without any torque interruption.

Suitably, the step a) comprises ensuring that a first sun wheel 26 in the first planetary gear 10 and a first planetary wheel carrier 50 in the first planetary gear 10 is connected via a first clutch device 56. Further, step f) suitably comprises connection of a second sun wheel 32 in the second planetary gear 12 and a second planetary wheel carrier 51 in the second planetary gear 12 with the use of a second clutch unit 58.

According to one embodiment, the at least one gear pair connected with the first planetary gear comprises a pinion gear and a cogwheel engaged with each other, which pinion gear is fixedly arranged with the first planetary gear, and which cogwheel may be connected with and disconnected from the countershaft, wherein step b) comprises ensuring that the cogwheel is disconnected from the countershaft.

According to one embodiment, the at least one gear pair connected with the second planetary gear comprises a pinion gear and a cogwheel engaged with each other, which pinion gear is fixedly arranged with the second planetary gear, and which cogwheel may be connected with and disconnected from the countershaft, wherein step b) comprises ensuring that the cogwheel is connected to the countershaft.

According to one embodiment, a fifth gear pair comprises a fifth and sixth cogwheel in engagement with each other, which fifth cogwheel is arranged so that it may be connected with and disconnected from the countershaft with the use of a fifth clutch element, wherein step b) comprises ensuring that the fifth cogwheel is disconnected from the countershaft.

Step c) suitably comprises ensuring that the main shaft 34, connected with the first planetary gear 10, is connected with an input shaft 95 of the range gearbox via a clutch mechanism 96.

The method steps a), b) and c) may be carried out in any order or in parallel.

Preferably, the method comprises the step f) of disconnecting the third ring gear 118 in the range gearbox 11 from the gearbox house 126, which at least partly surrounds the range gearbox 11. By disconnecting the rotatable component 118 in the range gearbox from the gearbox house 126, so that it is allowed to rotate, the range gearbox 11 is no longer in a low range position. Since the sixth gear pair 125 was previously connected to the countershaft 18 in step d), the disconnection of the rotatable component 118 in the range gearbox 11 also entails that the range gearbox 11 obtains a high range position.

Suitably, the steps f) and g) comprise generating a driving torque with the second electrical machine 16. The sixth gear pair 125 preferably comprises a seventh cogwheel 120 and an eighth cogwheel 124 arranged with the third planetary wheel carrier 110, which seventh cogwheel 120 is arranged in such a manner that it may be connected with and disconnected from the countershaft 18. The third planetary wheel carrier 114 is also connected with the output shaft 20. By way of the method, a torque is thus obtained in the output shaft 20 with the use of the second electrical machine 16, via the gear pair 66, 78 connected with the second planetary gear, to the countershaft 18 and further via the sixth gear pair 125 to the range gearbox's third planetary wheel carrier 114, and finally to the output shaft 20.

Preferably, step e) comprises connection of the sixth gear pair 125 to the countershaft 18, by way of controlling the second electrical machine 16 in such a manner that a synchronous rotational speed arises between the countershaft 18 and a seventh cogwheel 120, arranged in the sixth gear pair 125 on the countershaft 18.

According to one embodiment, the steps e)-f) comprise that the second electrical machine 16 is operated by electric power generated by the first electrical machine 14. In this manner, a shift to a high range position is achieved without torque interruption, without synchronization devices, and without the use of any energy storage device.

When the steps a)-g) have been completed, the hybrid powertrain 3 is driven in a gear in a high range position, wherein the high range position has been obtained by way of disconnecting the third ring gear 118 from the gearbox house 126, disconnecting the third sun wheel 112 and the third planetary wheel carrier 114 from each other, and by connecting the sixth gear pair 125. By connecting the third sun wheel 112 and the third planetary wheel carrier 114 additional gears in the high range position may be achieved.

Figure 4B:
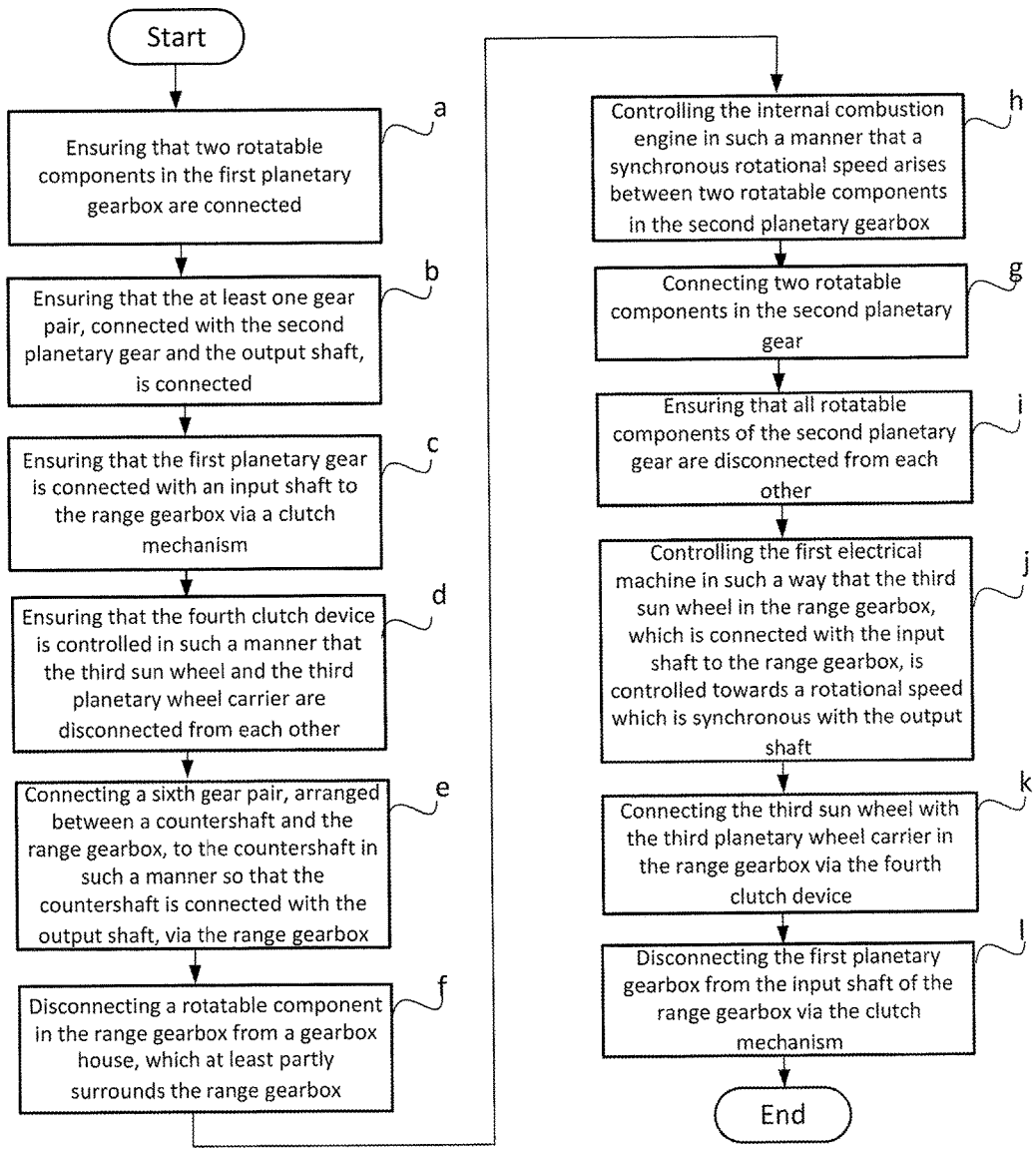

FIG. 4b shows a flow chart relating to a method to control a hybrid powertrain 3 in order to achieve a shift to a high range position without torque interruption. The hybrid powertrain 3 is adapted as described in FIG. 4a, and the method comprises the method steps described in FIG. 4a. When the method steps a) to g) have been completed, the hybrid powertrain 3 is driven in a gear in a high range position. In order to achieve additional gears in the high range position, the method according to the invention suitably comprises the additional steps, after step g):

i) ensuring that the rotatable components 22, 26, 50 of the first planetary gear 10 are disconnected from each other;

j) controlling the first electrical machine 14 in such a way that the third sun wheel 112 in the range gearbox 11, which is connected with the input shaft 95 to the range gearbox, is controlled towards a rotational speed which is synchronous with the output shaft 20; and k) connecting the third sun wheel 112 with the third planetary wheel carrier 114 in the range gearbox 11 with the use of the fourth clutch device 130.

By ensuring that the rotatable components 22, 26, 50 of the first planetary gear 10 are disconnected, the first electrical machine 14 may then be controlled in order to achieve a synchronous rotational speed between the third sun wheel 112 and the output shaft 20. When a synchronous rotational speed has been obtained, the third sun wheel 112 and the third planetary wheel carrier 114 may be connected with the use of the fourth clutch device 130. In this manner, the hybrid powertrain 3 is adapted for additional gear steps in a high range position without any torque interruption, without synchronizing devices and without the use of an energy storage device.

Steps i) to k) may be carried out immediately in connection with step f). Alternatively, one or several gear steps are carried out between step f) and steps i) to k). The method of shifting from a low range gear to a high range gear, and from one high range gear to another is described in connection with the description of FIGS. 2a-b.

According to one embodiment of the invention the method also comprises the step, after the step k):

l) disconnecting the first planetary gearbox 10 from the input shaft 95 of the range gearbox 11 via the clutch mechanism 96.

Since the rotatable components 22, 26, 50 of the first planetary gearbox 10 are disconnected from each other, and a synchronous rotational speed has been obtained between the third sun wheel 112 and the output shaft 20, it is subsequently suitable to shift the clutch mechanism 96 between the input shaft 95 of the range gearbox 11 and the first planetary gear 10, so that the first planetary gear 10 and the input shaft 95 of the range gearbox are no longer connected. Accordingly, gears in the high range position may be achieved, where the torque to the output shaft 20 is transmitted via the countershaft 18 and this sixth gear pair 125, at the same time as the first planetary gear 10 and the input shaft 95 of the range gearbox are disconnected from each other.

The method may also comprise the additional steps, after step l):

m) connecting the at least one gear pair 60, 72, connected with the first planetary gear 10 and the output shaft 20;

n) disconnecting the rotatable components 28, 32, 51 in the second planetary gear 12; and o) connecting the rotatable components 22, 26, 50 in the first planetary gear 10.

This achieves engagement of a gear in a high range position. The gear may correspond to the eighth gear described in connection with the description of FIGS. 2a-b, in the case where the third sun wheel 112 and the third planetary wheel carrier 114 are connected in the transition between a seventh gear and an eighth gear.

Furthermore, the method may comprise disconnection of the sixth gear pair 125 from the countershaft 18. The method may also comprise reconnection of the first planetary gear 10 and the input shaft 95 of the range gearbox with the use of the clutch mechanism 96. By ensuring first that the third sun wheel 112 and the third planetary wheel carrier 114 are connected with the use of the fourth clutch device 130, the sixth gear pair 125 may be disconnected, and the input shaft 95 of the range gearbox may be connected with the first planetary gear 10, without any torque interruption. Accordingly, a shift to gears in a high range position may be achieved without any torque interruption.

In the alternative where the third sun wheel 112 and the third planetary wheel carrier 114 are not connected in the transition between a seventh gear and an eighth gear, the first planetary gear 10 and the input shaft 95 of the range gearbox are connected throughout the shift operation in a high range position. Thus, step l) is not carried out after step k). Instead, the method comprises, after step k), disconnection of the seventh gear pair 125 from the countershaft 18 with the use of the seventh clutch element 122 and the ninth clutch sleeve 87.

According to the invention, a computer program P is provided, stored in the control device 48 and/or the computer 53, which may comprise procedures to control the hybrid powertrain 3 according to the present invention.

The program P may be stored in an executable manner, or in a compressed manner, in a memory M and/or a read/write memory.

The invention also relates to a computer program product comprising program code stored in a medium readable by a computer, to perform the method steps specified above, when said program code is executed in the control device 48 or a computer 53 connected to the control device 48. Said program code may be stored in a non-volatile manner on said medium readable by a computer 53.

The components and features specified above may, within the framework of the invention, be combined between different embodiments specified.

The invention claimed is:

1. A hybrid powertrain comprising:
   an internal combustion engine;
   a gearbox with an input shaft and an output shaft;
   a range gearbox connected to the output shaft;
   a first planetary gear connected to the input shaft;
   a second planetary gear connected to the first planetary gear;
   a first electrical machine connected to the first planetary gear;
   a second electrical machine connected to the second planetary gear;
   at least one gear pair connected with the first planetary gear and the output shaft; and
   at least one gear pair connected with the second planetary gear and the output shaft,
   wherein the internal combustion engine via the input shaft is connected with the first planetary gear,
   wherein the range gearbox comprises a third planetary gear with a third sun wheel and a third planetary wheel carrier and in that a fourth clutch device is arranged to connect and disconnect the third sun wheel with/from the third planetary wheel carrier.

2. A hybrid powertrain according to claim 1, wherein the fourth clutch device comprises a splines-equipped clutch sleeve, which is axially shiftable on the third sun wheel and the third planetary wheel carrier.

3. A hybrid powertrain according to claim 1, further comprising a countershaft arranged between the respective first and second planetary gear and the output shaft; and is connected with the output shaft via the range gearbox.

4. A hybrid powertrain according to claim 1, wherein the third planetary wheel carrier is connected with the output shaft.

5. A hybrid powertrain according to claim 1, further comprising a sixth gear pair is arranged between the countershaft and the third planetary wheel carrier.

6. A hybrid powertrain according to claim 5, wherein the sixth gear pair comprises a seventh cogwheel and an eighth cogwheel arranged with the third planetary wheel carrier in engagement with each other, which seventh cogwheel is arranged in such a manner that it may be connected with and disconnected from the countershaft.

7. A method to control a hybrid powertrain to achieve a shift to a high range position without torque interruption, wherein the hybrid powertrain comprises an internal combustion engine; a gearbox with an input shaft and an output shaft; a range gearbox, connected to the output shaft; a first planetary gear connected to the input shaft; a second planetary gear connected to the first planetary gear; a first electrical machine connected to the first planetary gear; a second electrical machine connected to the second planetary gear; at least one gear pair connected with the first planetary gear and the output shaft; and at least one gear pair connected with the second planetary gear and the output shaft, wherein the internal combustion engine is connected with the first planetary gear via the input shaft and wherein the range gearbox comprises a third planetary gear with a third sun wheel and a third planetary wheel carrier, and wherein a fourth clutch device is arranged to connect and disconnect the third sun wheel with/from the third planetary wheel carrier, wherein said method for controlling said hybrid powertrain comprises:
 a) ensuring that two rotatable components in the first planetary gear are connected;
 b) ensuring that the at least one gear pair connected with the second planetary gearbox and the output shaft is connected;
 c) ensuring that the first planetary gear is connected with an input shaft of the range gearbox via a clutch mechanism;
 d) ensuring that the fourth clutch device is controlled in such a manner that the third sun wheel and the third planetary wheel carrier are disconnected from each other;
 e) connecting a sixth gear pair arranged between a countershaft and the range gearbox with the countershaft so that the countershaft is connected with the output shaft via the range gearbox;
 f) disconnecting a rotatable component in the range gearbox from a gearbox house at least partly surrounding the range gearbox; and
 g) connecting two rotatable components in the second planetary gear.

8. A method according to claim 7, further comprising, after step f) and before step g):
 h) controlling the internal combustion engine in such a way that a synchronous rotational speed arises between two rotatable components in the second planetary gear.

9. A method according to claim 7, wherein in step f) the disconnected rotatable component in the range gearbox is a third ring gear.

10. A method according to claim 7, further comprising during steps f)-g) a driving torque is generated with the second electrical machine.

11. A method according to claim 7, wherein in step e) the sixth gear pair is connected with the countershaft by way of generating a synchronous rotational speed with the second electrical machine between the countershaft and a seventh cogwheel arranged on the countershaft of the sixth gear pair.

12. A method according to claim 7, further comprising in steps e)-f) the second electrical machine is operated with electric power generated by the first electrical machine.

13. A method according to claim 7, further comprising after step g):
 i) ensuring that the rotatable components of the first planetary gearbox are disconnected from each other;
 j) controlling the first electrical machine in such a way that the third sun wheel in the range gearbox, which is connected with the input shaft to the range gearbox is controlled towards a rotational speed which is synchronous with the output shaft; and
 k) connecting the third sun wheel with the third planetary wheel carrier in the range gearbox with the use of the fourth clutch device.

14. A method according to claim 13, further comprising, following step k):
 l) disconnecting the first planetary gearbox from the input shaft of the range gearbox via the clutch mechanism.

15. A method according to claim 14, further comprising, following step l):
 m) connecting the at least one gear pair connected with the first planetary gearbox and the output shaft;
 n) disconnecting the rotatable components in the second planetary gear; and
 o) connecting the rotatable components in the first planetary gear.

16. A method according to claim 7, wherein the at least one gear pair, which is connected with the first planetary gear comprises a pinion gear and a cogwheel in engagement with each other, which pinion gear is fixedly arranged with the first planetary gear and which cogwheel is arranged in such a manner that it may be connected with and disconnected from a countershaft, wherein step b) comprises ensuring that the cogwheel is disconnected from the countershaft.

17. A method according to claim 7, wherein the at least one gear pair, which is connected with the second planetary gear comprises a pinion gear and a cogwheel in engagement with each other, which pinion gear is fixedly arranged with the second planetary gear and which cogwheel is arranged in such a manner that it may be connected with and disconnected from a countershaft, wherein step b) comprises ensuring that the cogwheel is connected to the countershaft.

18. A method according to claim 7, wherein a fifth gear pair comprises a fifth and sixth cogwheel in engagement with each other, which fifth cogwheel is arranged so that it may be connected with and disconnected from the countershaft with the use of a fifth clutch element, comprises ensuring that the fifth cogwheel is disconnected from the countershaft.

19. A vehicle with a hybrid powertrain, wherein the hybrid powertrain comprises:
 an internal combustion engine;
 a gearbox with an input shaft and an output shaft;
 a range gearbox connected to the output shaft;
 a first planetary gear connected to the input shaft;
 a second planetary gear connected to the first planetary gear;
 a first electrical machine connected to the first planetary gear;
 a second electrical machine connected to the second planetary gear;
 at least one gear pair connected with the first planetary gear and the output shaft; and
 at least one gear pair connected with the second planetary gear and the output shaft,
 wherein the internal combustion engine via the input shaft is connected with the first planetary gear, wherein the range gearbox comprises a third planetary gear with a third sun wheel and a third planetary wheel carrier and in that a fourth clutch device is arranged to connect and disconnect the third sun wheel with/from the third planetary wheel carrier.

20. A computer program product comprising program code stored in a non-transitory computer-readable medium readable by a computer, said computer program product used to control a hybrid powertrain to achieve a shift to a high range position without torque interruption, wherein the hybrid powertrain comprises an internal combustion engine; a gearbox with an input shaft and an output shaft; a range gearbox connected to the output shaft; a first planetary gear connected to the input shaft; a second planetary gear connected to the first planetary gear; a first electrical machine connected to the first planetary gear; a second electrical machine connected to the second planetary gear; at least one gear pair connected with the first planetary gear and the output shaft and at least one gear pair connected with the second planetary gear and the output shaft, wherein the internal combustion engine via the input shaft is connected with the first planetary gear, wherein the range gearbox comprises a third planetary gear with a third sun wheel and a third planetary wheel carrier and in that a fourth clutch device is arranged to connect and disconnect the third sun wheel with/from the third planetary wheel carrier, said computer program code comprising computer instructions to cause one or more computer processors to perform the operations of:

a) ensuring that two rotatable components in the first planetary gear are connected;

b) ensuring that the at least one gear pair connected with the second planetary gearbox and the output shaft is connected;

c) ensuring that the first planetary gear is connected with an input shaft of the range gearbox via a clutch mechanism;

d) ensuring that the fourth clutch device is controlled in such a manner that the third sun wheel and the third planetary wheel carrier are disconnected from each other;

e) connecting a sixth gear pair arranged between a countershaft and the range gearbox with the countershaft so that the countershaft is connected with the output shaft via the range gearbox;

f) disconnecting a rotatable component in the range gearbox from a gearbox house at least partly surrounding the range gearbox; and g) connecting two rotatable components in the second planetary gear.

* * * * *

UNITED STATES PATENT AND TRADEMARK OFFICE
CERTIFICATE OF CORRECTION

Page 1 of 1

PATENT NO. : 10,543,738 B2
APPLICATION NO. : 15/511613
DATED : January 28, 2020
INVENTOR(S) : Mikael Bergquist et al.

It is certified that error appears in the above-identified patent and that said Letters Patent is hereby corrected as shown below:

In the Claims

In Column 30, Claim 5, Line 66:
Please delete the word "is"

In Column 32, Claim 18, please change Lines 45-48 to read:
"may be connected with and disconnected from the countershaft with the use of a fifth clutch element, wherein step b) comprises ensuring that the fifth cogwheel is disconnected from the countershaft."

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*